United States Patent [19]

Beard et al.

[11] Patent Number: 5,640,524
[45] Date of Patent: Jun. 17, 1997

[54] METHOD AND APPARATUS FOR CHAINING VECTOR INSTRUCTIONS

[75] Inventors: Douglas R. Beard, Eleva; Andrew E. Phelps; Michael A. Woodmansee, both of Eau Claire; Richard G. Blewett, Altoona; Jeffrey A. Lohman, Eau Claire; Alexander A. Silbey, Eau Claire; George A. Spix, Eau Claire; Frederick J. Simmons, Neillsville, all of Wis.; Don A. Van Dyke, Pleasanton, Calif.

[73] Assignee: Cray Research, Inc., Eagan, Minn.

[21] Appl. No.: 395,320

[22] Filed: Feb. 28, 1995

Related U.S. Application Data

[60] Division of Ser. No. 536,409, Jun. 11, 1990, Pat. No. 5,430,884, which is a continuation-in-part of Ser. No. 459,083, Dec. 29, 1989, Pat. No. 5,197,130.

[51] Int. Cl.$^6$ ............................................. G06F 12/00
[52] U.S. Cl. .................. 395/563; 364/937.7; 364/232.21
[58] Field of Search ............................ 395/375, 775, 395/800

[56] References Cited

U.S. PATENT DOCUMENTS

| | | | |
|---|---|---|---|
| 3,811,040 | 5/1974 | Weinfurt | 364/570 |
| 3,916,388 | 10/1975 | Shimp et al. | 395/800 |
| 4,075,704 | 2/1978 | O'Leary | 364/748 |
| 4,099,229 | 7/1978 | Kancler | 395/375 |
| 4,128,880 | 12/1978 | Cray, Jr. | 395/800 |
| 4,219,874 | 8/1980 | Gusev et al. | 395/375 |
| 4,236,206 | 11/1980 | Strecker et al. | 395/375 |
| 4,241,397 | 12/1980 | Strecker et al. | 395/375 |
| 4,354,232 | 10/1982 | Ryan | 364/200 |
| 4,502,110 | 2/1985 | Saito | 364/200 |
| 4,502,111 | 2/1985 | Riffe et al. | 395/775 |
| 4,580,214 | 4/1986 | Kubo et al. | 395/280 |
| 4,760,525 | 7/1988 | Webb | 395/800 |
| 4,785,400 | 11/1988 | Kojima | 395/600 |
| 4,888,679 | 12/1989 | Fossum et al. | 364/200 |
| 4,942,525 | 7/1990 | Shintani et al. | 395/375 |
| 5,008,812 | 4/1991 | Bhandarkar et al. | 395/375 |
| 5,010,477 | 4/1991 | Omoda | 395/800 |
| 5,043,867 | 8/1991 | Bhandarkar et al. | 395/375 |
| 5,113,521 | 5/1992 | McKeen et al. | 395/650 |
| 5,123,095 | 6/1992 | Papadopoulos | 395/375 |
| 5,168,573 | 12/1992 | Fossum et al. | 395/800 |
| 5,175,862 | 12/1992 | Phelps et al. | 395/800 |
| 5,193,187 | 3/1993 | Strout, II et al. | 395/650 |
| 5,197,130 | 3/1993 | Chen et al. | 395/325 |
| 5,208,914 | 5/1993 | Wilson et al. | 395/275 |
| 5,349,692 | 9/1994 | Nishi | 395/800 |

OTHER PUBLICATIONS

"Dynamic Instruction Scheduling and the Astronautics ZS–1," James E. Smith, Astronautics Corporation of America, Jul., 1989, pp. 21–35.

*Primary Examiner*—David Y. Eng
*Attorney, Agent, or Firm*—Schwegman, Lundberg, Woessner & Kluth, P.A.

[57] ABSTRACT

A vector processing system includes a main memory, vector registers, vector resources for accessing memory to transfer vector data between main memory and the vector registers and to perform operations on the vector data. Data words stored in non-consecutive address locations of a segment of main memory are accessed for processing. Offset address values of a number of the data words are stored in consecutive elements of a first vector register. A vector gather instruction is executed which adds each offset address value to a base address value to calculate main memory addresses representing main memory storage locations of the data words, retrieves the data words from the main memory, and stores the data words in consecutive elements of a second vector register in an order corresponding to that in which the offset address values are stored in the first vector register. A second vector instruction is chained to the gather instruction for performing an operation upon the retrieved data words and storing the results in a third vector register. A vector scatter instruction is chained to the second vector instruction to return the results to the main memory.

8 Claims, 30 Drawing Sheets

Microfiche Appendix Included
(5 Microfiche, 323 Pages)

ONE 1-PARCEL INSTRUCTION FORMAT

| 63 | | | 32 | 31 | 0 |
|---|---|---|---|---|---|
| OP | I | J | K | PAD | |

- ONE CYCLE TO ISSUE

*Fig. 4A*

TWO 1-PARCEL INSTRUCTION FORMAT

| 63 | | | | 32 | 31 | | 0 |
|---|---|---|---|---|---|---|---|
| OP | I | J | K | OP | I | J | K |

- TWO CYCLES TO ISSUE
- NO INTERRUPT BETWEEN THESE INSTRUCTIONS

*Fig. 4B*

ONE 2-PARCEL INSTRUCTION FORMAT

| 63 | | | 32 | 31 | 0 |
|---|---|---|---|---|---|
| OP | I | J | K | M | |

- ONE CYCLE TO ISSUE

*Fig. 4C*

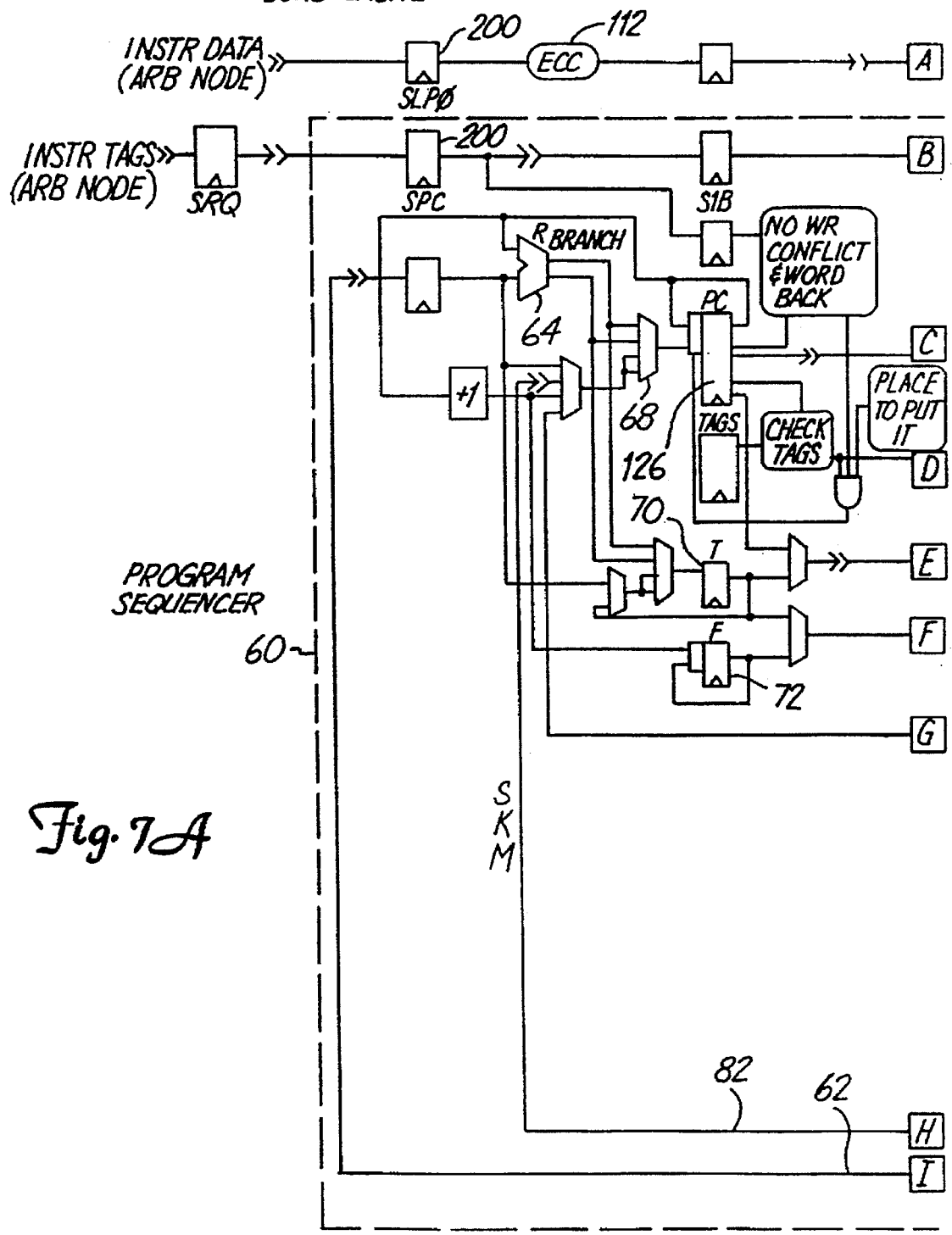

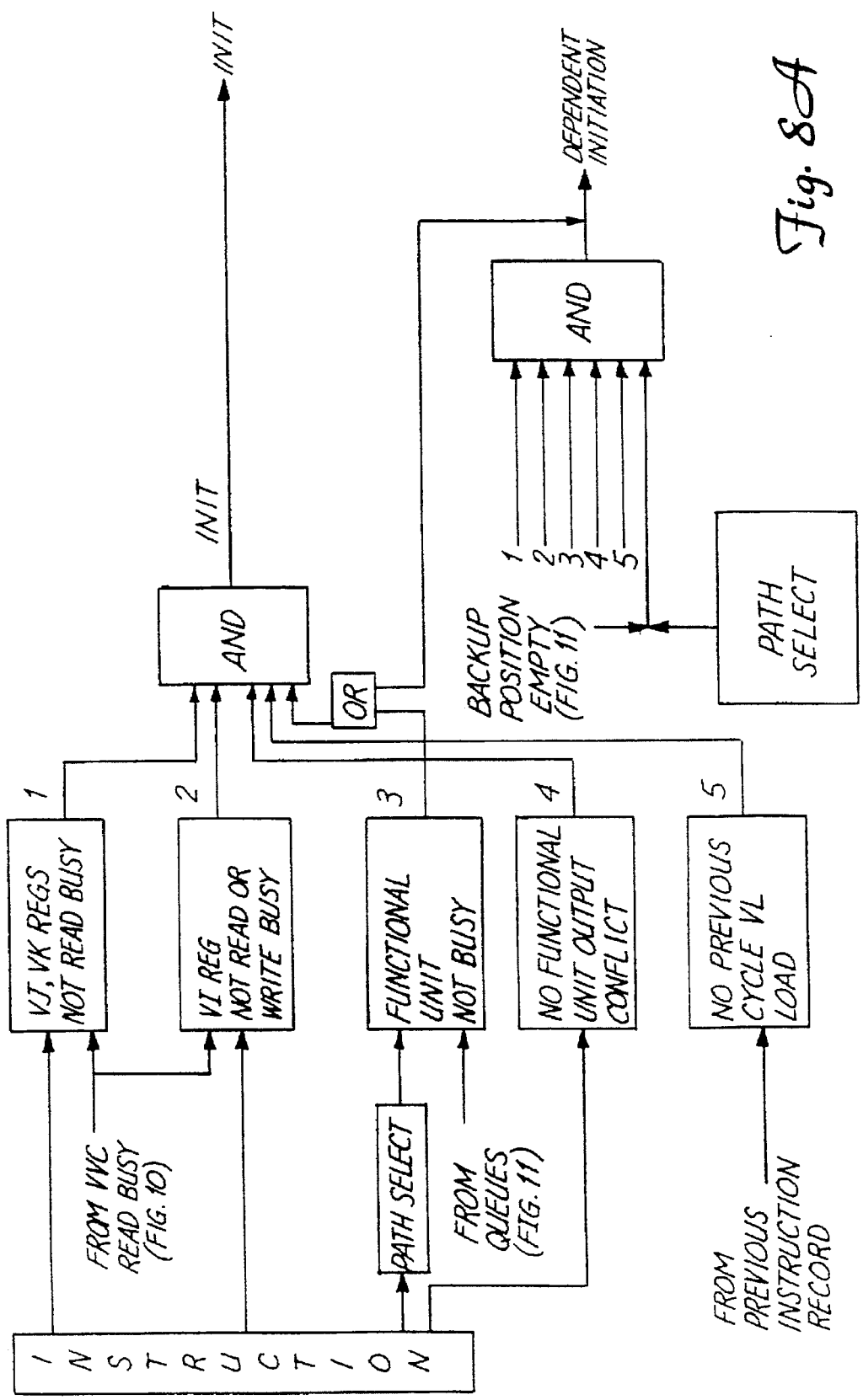

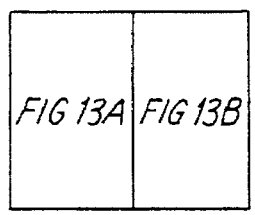
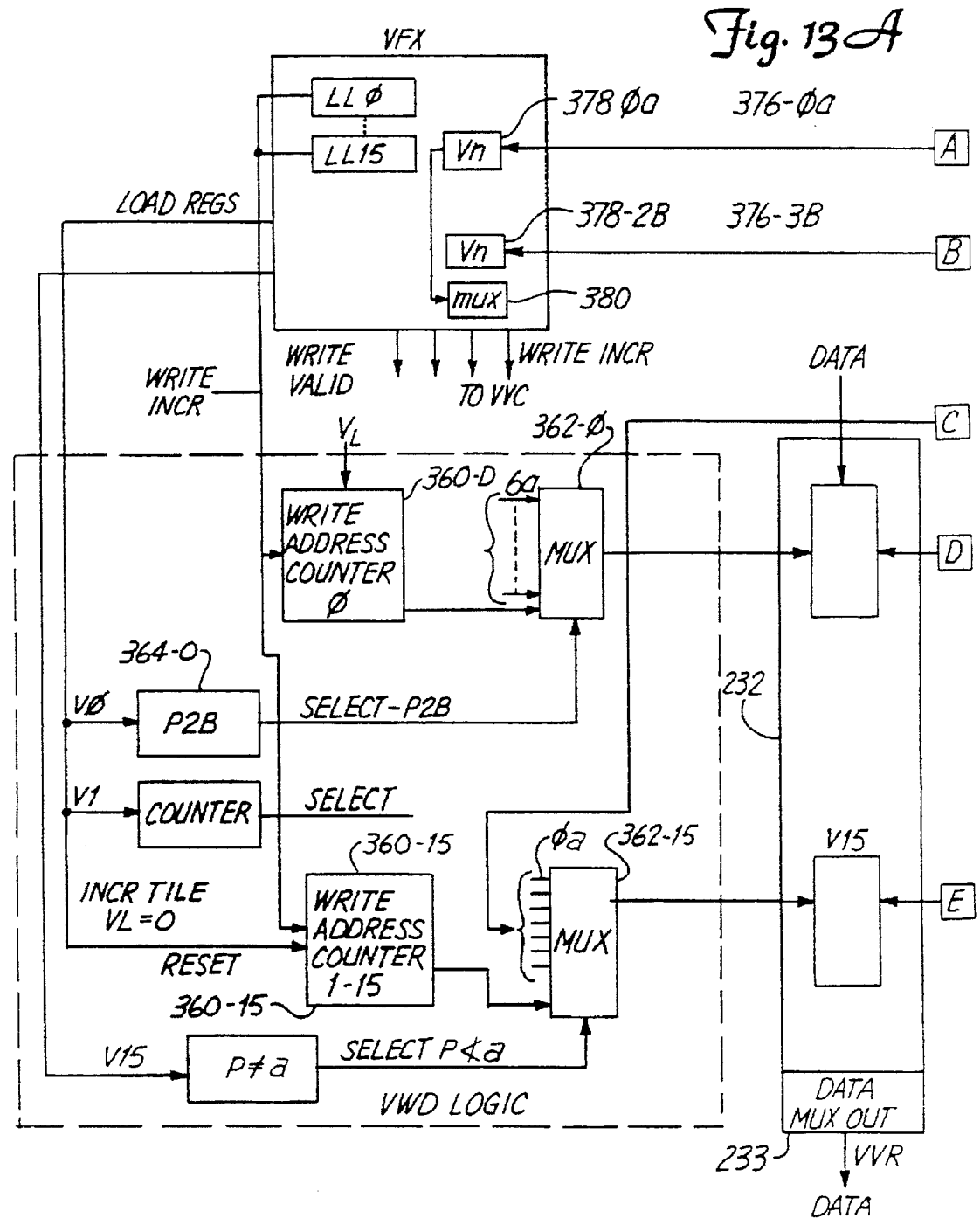
Fig. 13
Fig. 13A

| T0 | READ BUSY | WRITE BUSY |
|---|---|---|
| T0 |  | V0 |
| 1 | V0 | V1 |
| 2 |  | V2 |
| 3 |  |  |
| 4 |  | V3 |
| 5 | V3 | V4 |
| 6 | V4 | V5 |
| 7 | V5 |  |
| 8 |  | V6 |
| 9 |  | V9 |
| 10 | V6 | V7 |
| 11 | V7 | V8 |
| 12 | V8 |  |
| 13 | V9 | V10 |
| 14 |  | V12 |
| 15 | V12 |  |

Fig. 16C

METHOD AND APPARATUS FOR CHAINING VECTOR INSTRUCTIONS

RELATED APPLICATIONS

This is a division of application Ser. No. 07/536,409, filed Jun. 11, 1990 now U.S. Pat. No. 5,430,884, which application is a continuation-in-part of an application filed in the United States Patent and Trademark Office on Dec. 29, 1989, entitled CLUSTER ARCHITECTURE FOR A HIGHLY PARALLEL SCALAR/VECTOR MULTIPROCESSOR SYSTEM, Ser. No. 07/459,083, now U.S. Pat. No. 5,197,130, issued Mar. 23, 1993, and assigned to the assignee of the present invention, a copy of which is attached as an appendix and the disclosure of which is hereby incorporated by reference in the present application. The application is also related to co-pending applications filed concurrently herewith, entitled METHOD AND APPARATUS FOR A SPECIAL PURPOSE BOOLEAN ARITHMETIC UNIT, Ser. No. 07/536,197, now U.S. Pat. No. 5,175,862, issued Dec. 29, 1992, and METHOD AND APPARATUS FOR NON-SEQUENTIAL RESOUCE ACCESS, Ser. No. 07/535,786, now U.S. Pat. No. 5,208,914, issued May 4, 1993, FAST INTERRUPT MECHANISM FOR A MULTI-PROCESSOR SYSTEM, Ser. No. 07/536,199, now U.S. Pat. No. 5,193,187, issued Mar. 9, 1993, entitled FAST INTERRUPT MECHANISM FOR INTERRUPTING PROCESSORS IN PARALLEL IN A MULTIPROCESSOR SYSTEM WHEREIN PROCESSORS ARE ASSIGNED PROCESS ID NUMBERS, all of which are assigned to the assignee of the present invention, a copy of each of which is also attached and the disclosure of which is hereby incorporated by reference in the present application.

REFERENCE TO MICROFICHE APPENDIXES

Appendix A: 1 sheet of 21 frames. Appendix B: 3 sheets of 289 frames. Appendix D: 1 sheet of 13 frames. Appendixes A, B, and D are described at the end of the description of the preferred embodiments.

TECHNICAL FIELD

This invention relates generally to the field of computer processors. More particularly, the present invention relates to an improved high performance computer processor that is capable of scalar and vector processing.

BACKGROUND ART

In an effort to increase the processing speed and flexibility of multiprocessor computer processing systems, the parent application to the present invention, application Ser. No. 07/459,083, now U.S. Pat. No. 5,197,130, issued Mar. 23, 1993 provides a cluster architecture for highly parallel multiprocessor systems wherein a multiple number of processors and external interface means can make multiple and simultaneous requests to a common set of shared hardware resources.

Regardless of the manner in which such multiprocessor systems are organized, the individual performance of each of the processors in a multiprocessor system can and does affect the overall performance of the system. Similarly, the functional capabilities of the individual processor can also affect the performance of the system. Accordingly, most prior art supercomputers have attempted to increase both the performance and the functional capabilities of the individual computer processors in such supercomputers.

One of the first performance and functional improvements involved the use of both a scalar and vector processing element in each of the processors as shown, for example, in U.S. Pat. No. 4,128,880, issued Dec. 5, 1978 to S. R. Cray Jr. Since that time, numerous improvements have been made to the functional and operational capabilities of various scalar/vector processors in an effort to increase the performance of such processors.

While the improvements made in the art of scalar/vector processors have increased the performance of scalar/vector processors, there remain a number of areas in which the performance and operation of scalar/vector processors can be improved. Some of the areas of improvement include providing coordination mechanisms between the scalar and vector processors, particularly with respect to instruction execution in each of the processors, allowing the functional units of the vector processor to complete different types of arithmetic operations in a different number of cycles, allowing both the scalar and vector processor to access shared resources in a non-sequential manner, providing mechanisms for accessing the vector registers that allow the vectorization of conditional IF statements and the ability to access the vector registers at relative start addresses, and improving the ability of the scalar/vector processor to perform context switches.

One of the areas in which present scalar/vector processors experience performance problems is in the instruction processing procedure for the vector processor. Current vector processors put some number of vector instructions in a wait-to-issue queue. As a vector instruction already in the vector processor pipeline completes, the resources required by the waiting instruction are released. These resources include memory, vector registers, scalar values, and functional units. It is the function of the instruction control mechanism of the scalar/vector processor to determine when the required resources for a vector instruction are available. In present instruction control mechanisms, the vector instruction waits to enter the instruction pipeline during the time that the control mechanism surveys to see if the required resources are free, during the time that those resources come free and during the time that the control mechanism actually recognizes that the resources are available. It is only after these increments of time have elapsed that a new vector instruction is issued. While this resource determination process is ongoing, no new vector instructions are fed into the instruction pipeline. As a result, a bubble or gap in the instruction pipeline of the vector processor is created that decreases the processing performance of the vector processor.

Although present scalar/vector processors are capable of increased performance as compared to traditional computer processors, areas still exist in which performance improvements can be made in the design of scalar/vector processors. Accordingly, it would be desirable to provide a design for a scalar/vector processor and methods and apparatus associated therewith that are capable of improving the performance and operation of the scalar/vector processor.

SUMMARY OF THE INVENTION

The present invention provides an apparatus and method for accessing data words stored in non-consecutive address locations of a segment of main memory for processing in a vector processing system having a main memory, a plurality of vector registers, vector resources for accessing memory to transfer vector data between main memory and the vector registers and to perform operations on the vector data. The method and apparatus of the present invention includes storing in consecutive elements of a first vector register offset address values of a number of the data words. A single vector gather instruction is executed which adds each offset address value to a base address value to calculate main memory addresses representing main memory storage locations of the data words, retrieves the data words from the main memory storage locations corresponding to the calculated main memory addresses, and stores the data words in consecutive elements of a second vector register in an order corresponding to that in which the offset address values are stored in the first vector register. At least a second vector instruction is chained to the gather instruction for performing an operation upon the retrieved data words and storing the results in a third vector register.

The method and apparatus of the present invention preferrable includes chaining a single vector scatter instruction to the second vector instruction to return the results to the main memory storage locations of the corresponding retrieved data words.

In one embodiment of the present invention, the retrieved data words are returned for storage in the second vector register in an order differing from the sequential order in which the data words are requested by the gather instruction. The retrieved data words are preferrably stored in the consecutive elements of the second vector register in the sequence in which the data words are received.

In one embodiment of the present invention, each successive data word is stored in the vector register in clock cycles which are not necessarily consecutive.

One embodiment of present invention includes circuitry for inhibiting the reading of the vector data words from each succeeding vector element until each succeeding vector element has been loaded with its received data word.

One embodiment of the present invention includes vector program controlled circuitry for retrieving an ordered set of operands from a vector register starting with an operand other than the first operand of the ordered set. Further circuitry in this embodiment disables the chaining of instructions when vector operand retrieval starts with an operand other than the first operand of an ordered set.

Thus, the present invention specifically provides new gather and scatter instructions that run fully chained together in a pipeline, as if they were normal loads and stores, but without the memory latency that accompanies unchained gathers and scatters. In prior art computers, when a operation requires non-consecutive loads and stores to memory using an offset from a register, such computations are not supplied with enough resources to sustain a pipeline. Previous processors first load the offset data element into a register, feed each element of data into the functional unit, and then write each result into a register. At the end of the computations, the register is then stored out to memory. This processing occurs in segments, with built-in cycles of memory read and write overhead. By contrast, chaining sends the succeeding elements through without halt to be operated upon and stored to memory, thereby covering memory latency and increasing processor and system efficiency. This new capability supports fast processing among Monte Carlo-based codes.

DESCRIPTION OF THE DRAWINGS

FIGS. 4a–4c are schematic diagrams of the various instruction formats.

FIGS. 8A–8C diagrammatically illustrates the initiation logic decision process.

FIGS. 13a–13b illustrate the vector register read and write controls and addressing paths.

FIGS. 16A–16C illustrates diagrammatically the initiation of a group of instructions and certain of the processor elements affected thereby.

DESCRIPTION OF THE PREFERRED EMBODIMENTS

Figure 1:
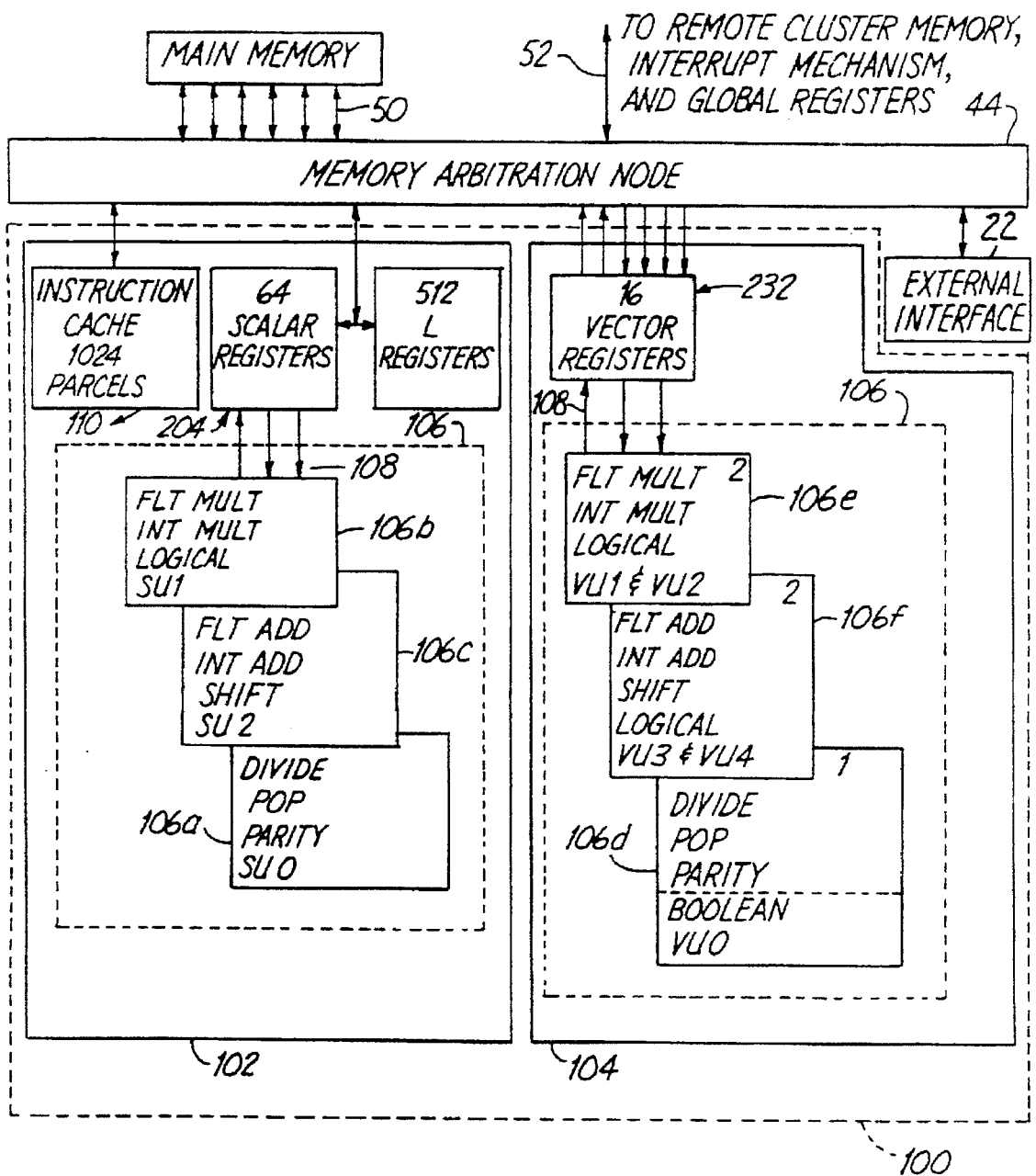
FIG. 1 is a block diagram of a single scalar/vector processor of the preferred embodiment.

Referring now to FIG. 1, a block diagram showing a single processor 100 that comprises the processor in the preferred embodiment of the present invention will be described. It will be recognized that the resource monitoring and dependent initiation methods of the present invention may be implemented in any number of processors, and still be within the scope of the present invention. For example, the resource monitoring and dependent initiation methods could be implemented in a single vector processor that did not have the capability of both vector and scalar processing, or in minimally parallel processors.

The processor 100 is logically and physically partitioned into a scalar means 102 and a vector means 104. Both the scalar means 102 and the vector means 104 have their own register set and dedicated arithmetic resources. All registers and data paths in the processor 100 are 64-bits (one word) wide. In the preferred embodiment, there are 64 scalar S registers 204 and 512 local L registers. The L registers serve as a software-managed register cache for the scalar means 102. The vector means 104 has 16 vector V registers in unit 232. The architecture can support up to a total combination of 256 S and V registers per processor 100. Each processor 100 also has up to 256 control C registers (FIG. 2) that are physically distributed throughout the processor 100 and are used to gather and set control information associated with the operation of the processor.

The scalar means 102 and vector means 104 that comprise the high-speed processor 100 of the preferred embodiment are capable of simultaneous operation. Both the scalar means 102 and the vector means 104 include a plurality of arithmetic resources in the form of arithmetic functional units 106. For the scalar means 102, the arithmetic functional units 106 include: Scalar Unit SU0 (divide, pop, and parity); Scalar Unit SU1 (floating point multiply, integer multiply, and logical operations); and Scalar Unit SU2 (floating point addition, integer addition, and shift operations). For the vector means 104, the arithmetic functional units 106 include: Vector Unit VU0 (divide, pop, parity and boolean); Vector Units VU1 and VU2 (floating point multiply, integer multiply, and logical operations); and Vector Units VU3 and VU4 (floating point addition, integer addition, logical and shift operations). Internal paths 108 to each of the functional units 106 may be allocated independently in the scalar means 102 and vector means 104 and each of the functional units 106 can operate concurrently, thereby allowing the scalar means 102 and vector means 104 to operate concurrently. No common functional units 106 are shared between the scalar means 102 and the vector means 104.

Figure 2:
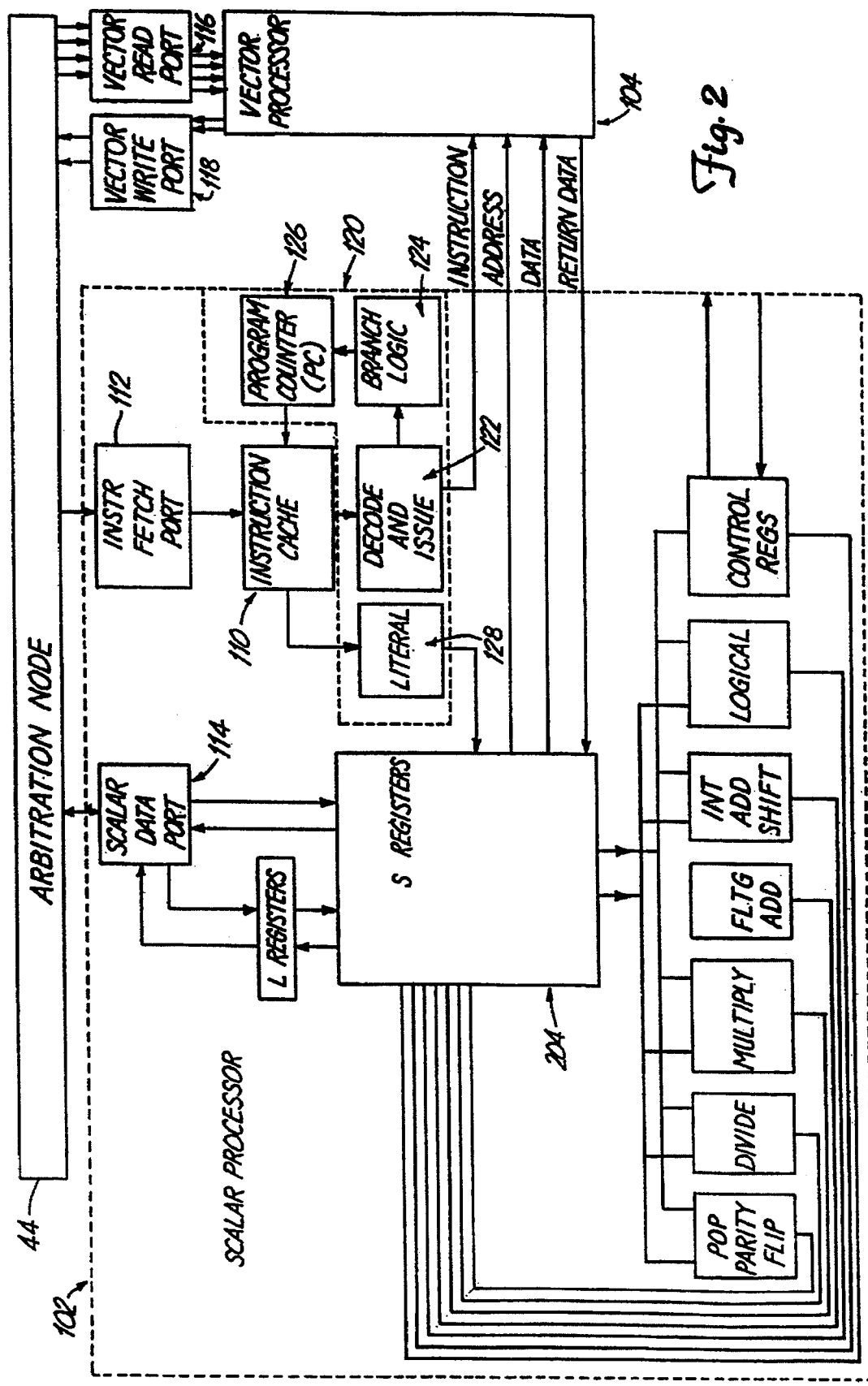
FIG. 2 is a more detailed block diagram of the instruction execution logic elements of the scalar means shown in FIG. 1.

Referring now to FIG. 2, the scalar means 102 receives all control information in the form of instructions via an instruction cache 110. The instruction cache 110 is connected to an arbitration node 44 through an instruction fetch port 112. Data information is provided to both the scalar means 102 and vector means 104 through a series of data ports. A single bi-directional scalar data port 114 supports both loads and stores to the S and L registers in the scalar means 102. Four vector load ports 116 and two vector store ports 118 support data transfers between the vector means 104 and memory 14.

An instruction execution unit 120 in the scalar means 102 includes decode and issue means 122, branch logic means 124, a program counter (PC) register 126 and literal transfer means 128. The instruction execution unit 120 is pipelined with instruction fetch, decode and execution. The instruction pipeline is capable of sustaining an instruction issue rate of one instruction per cycle. All instructions are decoded directly without the support of microcode. Instruction issue and control is handled separately for scalar and vector instructions by the respective scalar means 102 and vector means 104. Both one- and two-parcel instructions (32 bits per parcel) are supported in the instruction cache 110.

Each instruction, vector or scalar, has a nominal starting point referred to as issue. All scalar and vector instructions must issue (i.e., begin execution) one instruction at a time in order. After the issue clock cycle, operands are read and operations are performed in a pipeline fashion using the various arithmetic functional units 106 of the respective scalar means 102 or vector means 104 if such functions are requested by the instruction. Instructions may complete in any order.

Scalar and vector instructions have different requirements to issue. A scalar operation will not issue until all of its operand data is available. Once a scalar instruction issues, it will complete execution in a fixed number of clock cycles. Unlike current vector processors, a vector instruction in the present invention may issue without regard to the availability of its required vector resources. Not only can the necessary vector data be unavailable, but the V registers, memory ports (as explained hereinafter) and functional units 106 all may be busy. For a vector instruction to issue, however, there must be a check for the availability of any scalar data that may be needed, such as in scalar/vector operations or as in a scalar value required for a memory address. Also, a vector instruction cannot be issued unless a vector initiation queue has an empty position for staring the instruction.

Figure 3:
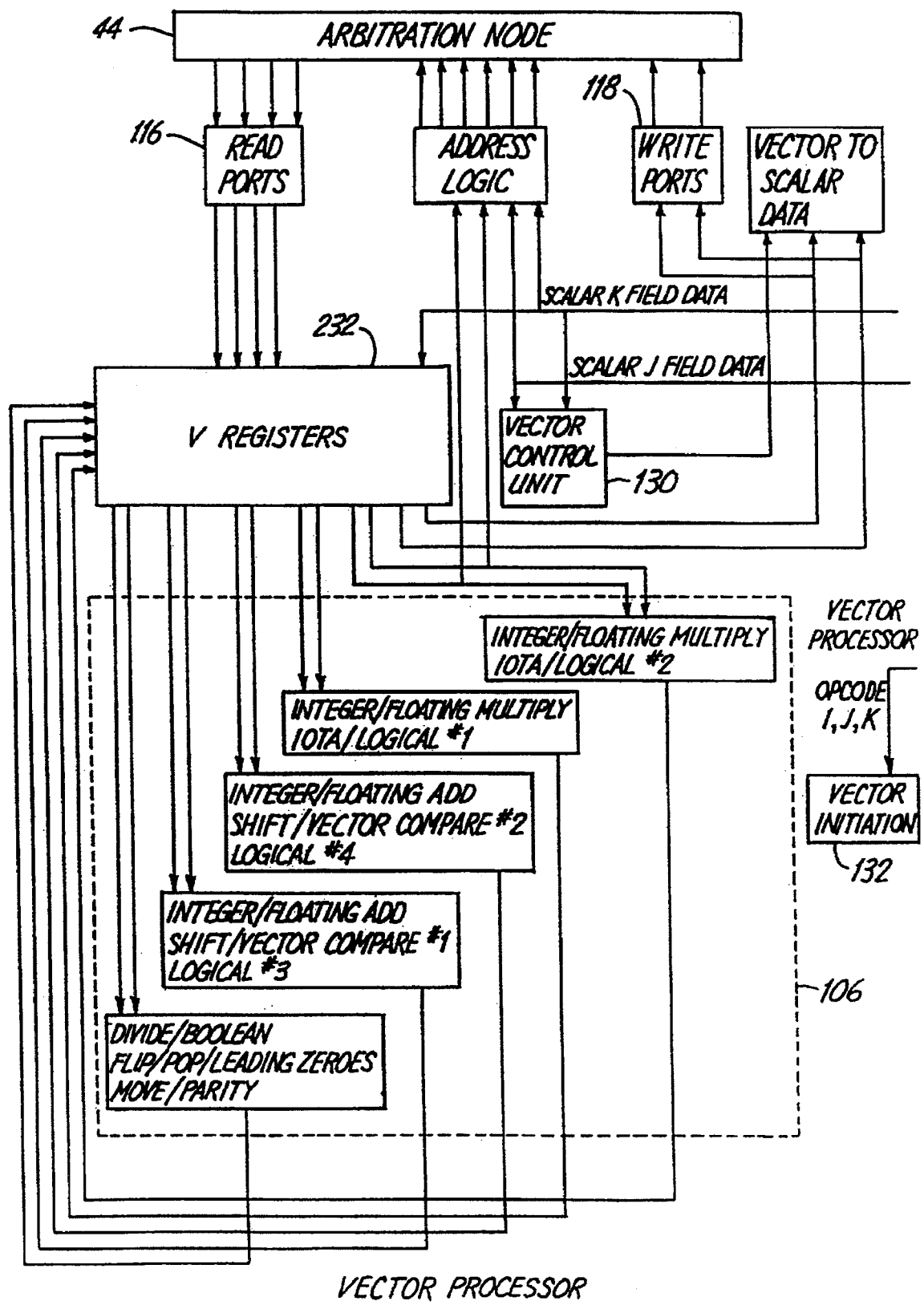
FIG. 3 is a more detailed block diagram of the vector means shown in FIG. 1.

Referring now to FIG. 3, once a vector instruction has issued, it must then "initiate". The vector control unit 130 starts each vector instruction in turn, at a maximum of one per clock cycle, after checking the availability of the vector instruction's required resources. In the preferred embodiment of the present invention, a vector initiation queue 132 holds up to five vector instructions that have issued, but not yet initiated. While this queue is full, subsequent vector instructions will not issue. A vector instruction may "normally" initiate only if the required V registers and required functional unit or memory are not busy. A vector instruction may dependently initiate before a functional unit 106 or memory port is available but the vector control unit 130 will delay the first element of the vector operation until the previous operation on functional unit 106 or memory port is completed.

Because of the difference between issue and initiate with respect to the vector means 104, the vector means 104 and the scalar means 102 are not in lock step, so no assumptions should be made about synchronization. Memory synchronization rules should be followed between the scalar means 102 and the vector means 104. For example, just because a second load to a V register has issued does not mean that the first load to that V register is complete.

Referring now to FIGS. 4a–4c, the various instruction formats for the instruction set for the processor 100 will be described. Instructions are either one parcel (32 bits) or two parcels (64 bits). A two-parcel instruction may not cross a word boundary. Therefore, a 64-bit instruction may contain any one of the following: one two-parcel instruction (FIG. 4a), two one-parcel instructions to be executed with the upper parcel first (FIG. 4b), or a one-parcel instruction in the upper parcel and a pad code in the lower parcel (FIG. 4c). The pad code is not an instruction and does not take any time to execute.

The fields in the instruction format may contain various information. The "op" field contains an 8-bit opcode. The "i" field usually designates the target of the instruction. This is either the number of an S register, or the one's complement of the number of a V register. In memory stores, the "i" field designates the register to be stored. This field sometimes contains an opcode modifier, such as a comparison type. The "j" field usually designates one the operands. If so, "j" must contain the number of an S register, or the one's complement of the number of a V register. Most instructions require that "j" specify a V register if and only if "i" specifies a V register. The "k" field either designates a register (S or V as above) for the second operand, or it contains an 8-bit signed constant to use as an operand. In instructions where one operand is a vector and the other is a scalar or constant, the "k" field is used for the scalar or constant. In some instructions, a combined "jk" or "ij" field is used for a 16-bit constant. The "m" field may contain a 32-bit constant for load-literal instructions or relative branches. It may be combined with the "j" and "k" field to form a 48-bit "jkm" field for load literal instructions or absolute addresses.

Figure 5A:
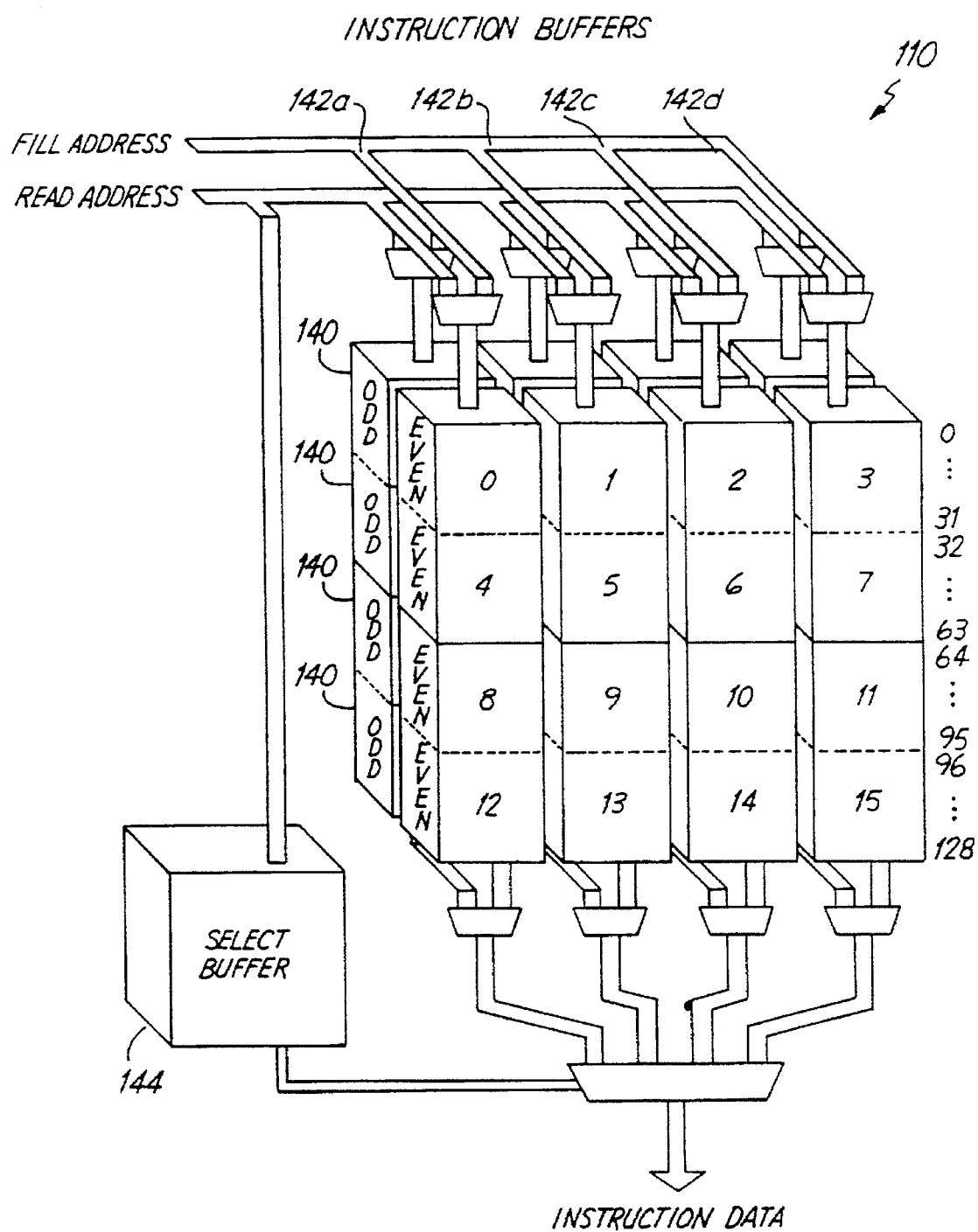
FIG. 5a is a block diagram showing the various instruction buffers that comprise the instruction cache.
Figure 5B:
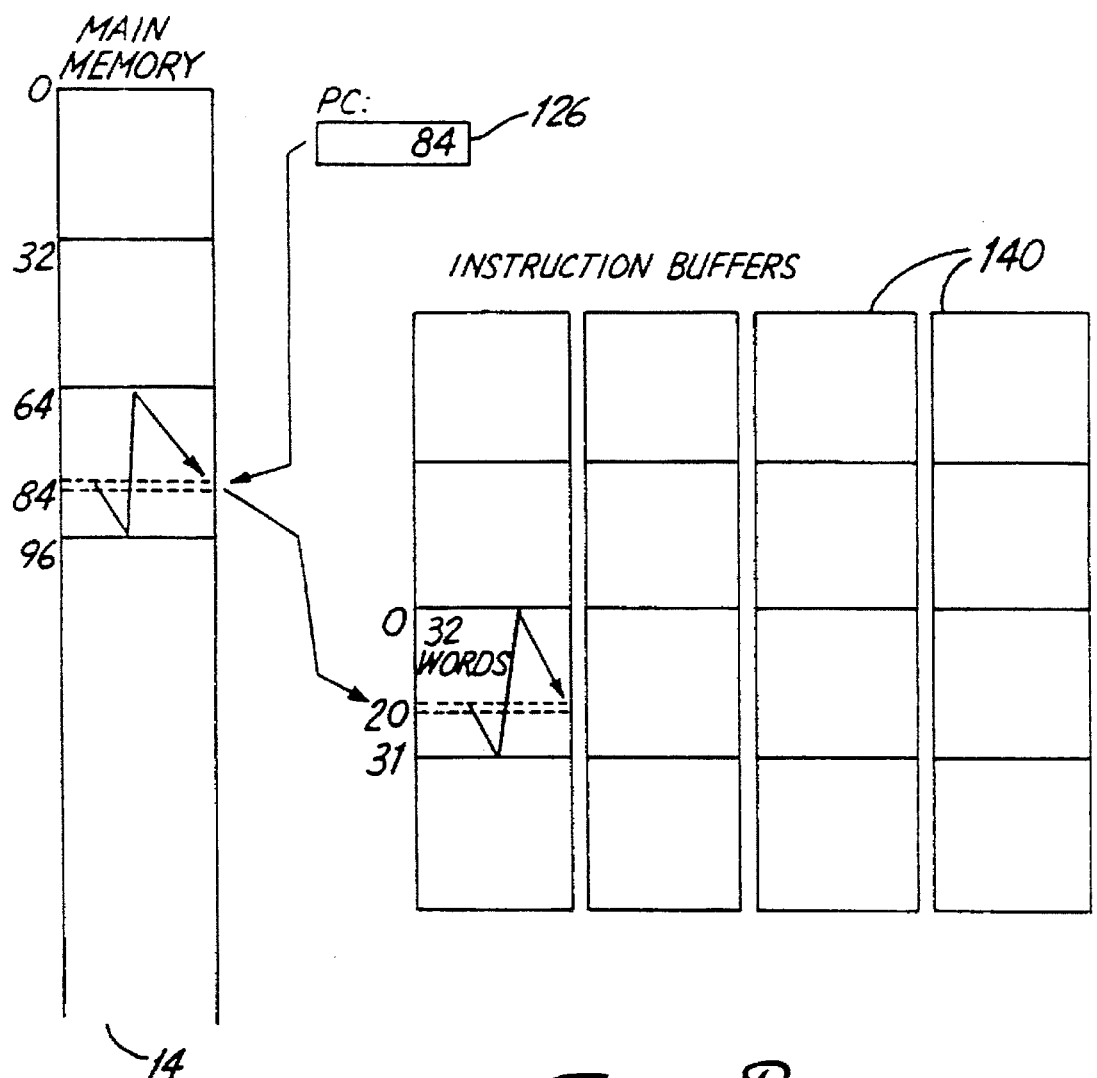
FIG. 5b is a simplified block diagram showing the operational flow of a buffer-fill operation of the instruction cache.

Referring now to FIGS. 5a and 5b, the operation of the instruction cache 110 (FIGS. 1 and 2) will be described. The instruction cache 110 consists of sixteen buffers 140. Each buffer 140 can hold 32 words (64 parcels) of instructions. The buffers are logically and physically organized into four columns 142a, 142b, 142c and 142d, with four buffers 140 per column 142a–d. Each column 142a–d has separate fill address and read address logic. The buffers 140 in each column 142a–d are arranged to address a consecutive block of addresses with low-order bit addresses ranging from 0–31 (buffers 0, 1, 2 and 3); 32–63 (buffers 4, 5, 6 and 7); 64–95

(buffers 8, 9, 10 and 11); and 96–127 (buffers 12, 13, 14 and 15). In this way, the columns 142a–d are four-way associative; that is, a word at any given address may be found in one of four columns 142a–d depending upon the high-order bits of its address. A select buffer logic 144 is used to choose which of the four columns 142a–d will be muxed to the instruction execution unit 120 (FIG. 2).

In principal, an instruction cache is a compromise between the need to have instructions quickly available to the processor and the impracticality of having each instruction stored in a separately addressable memory location. In a typical instruction cache, a single smaller block of instructions is loaded into a faster access cache hardware to decrease the access time. If an instruction is not found in the cache (e.g., a jump is made out of the range of the cache), then new instructions must be loaded into the cache from the main memory. If a program contains many jumps or branches, this process of loading new instructions into the cache may be repeatedly performed leading to an undesirable condition known as cache thrashing. The organization of the instruction cache 110 as a four-way associative buffer allows the instruction cache 110 of the preferred embodiment to minimize both instruction fetch times and cache thrashing.

In the preferred embodiment, the PC register 126 (FIG. 2) contains a 32-bit word address and is used to fetch the 64-bit words out of the instruction cache 110. Words are fetched from the instruction cache 110 at a rate of up to one per clock cycle as needed by the instruction execution unit 120. There is no cycle penalty for two-parcel instructions. The addresses as found in the PC register 126 are defined as follows:

Bits 0–4 select a word within a buffer 140;

Bits 5–6 select a buffer 140 within a column 142; and

Bits 7–31 are used to match the tag for this instruction.

The tag for the instruction is generated as the instruction is read from main memory 14 as described hereinafter. In general, the tag may be thought of as the high-order logical address bits for a thirty-two word block of instructions. Each buffer 140 has a unique tag associated with the instructions stored in that buffer. For example, buffer 0 might contain the thirty-two instructions having address '1C00' to '1C1F' and buffer 4 might contain the thirty-two instructions having address 'C320' to 'C33F'.

If a match is not found for the tag of the next requested instruction within any of the buffers 140, an "out-of-buffer" condition exists and the hardware will automatically start a buffer-fill operation. One of the four buffers 140 that contains the same least significant bits as the instruction requested (bits 0–4) is selected during the buffer-fill operation for overwriting on a least-recently-used basis. That buffer is given a new tag value and filled from main memory 14. The buffer-fill operation starts with the word pointed to by the PC register 126 and wraps through all 32 words in that particular buffer 140. When the buffer-fill operation is completed, the buffer 140 contains 32 new words of instructions that are aligned to a 32-word boundary in main memory 14.

Referring to FIG. 5b, a simplified diagram of the operational flow of an automatic fill-buffer operation is shown. In this example, a jump to location "84" instruction causes the buffer-fill operation because location "84" is not found in any of the buffers 140 of the cache 110. One of the four columns of the buffers 140 is chosen by a least-recently-used algorithm. The row is chosen based on bits 5–6 of the PC register 126. The buffer-fill operation starts at word "84" in the main memory 14, continues through the end of the 32-word area, then wraps back to the previous 32-word boundary and continues through word "83" to complete the fill of the particular buffer 140. In this manner, a 32-word block of instructions is loaded from main memory 14, but the target word is loaded first. Execution may resume as soon as word "84" appears in the instruction buffer 140. A program may explicitly request a buffer-fill operation by specifying a "fill" instruction. The fill instruction specifies an address in main memory 14, but does not specify which buffer 140 the instructions will be loaded into. The buffer is selected on the basis of the same least-recently-used algorithm as used for an automatic buffer-fill in response to an out-of buffer condition.

Figure 6:
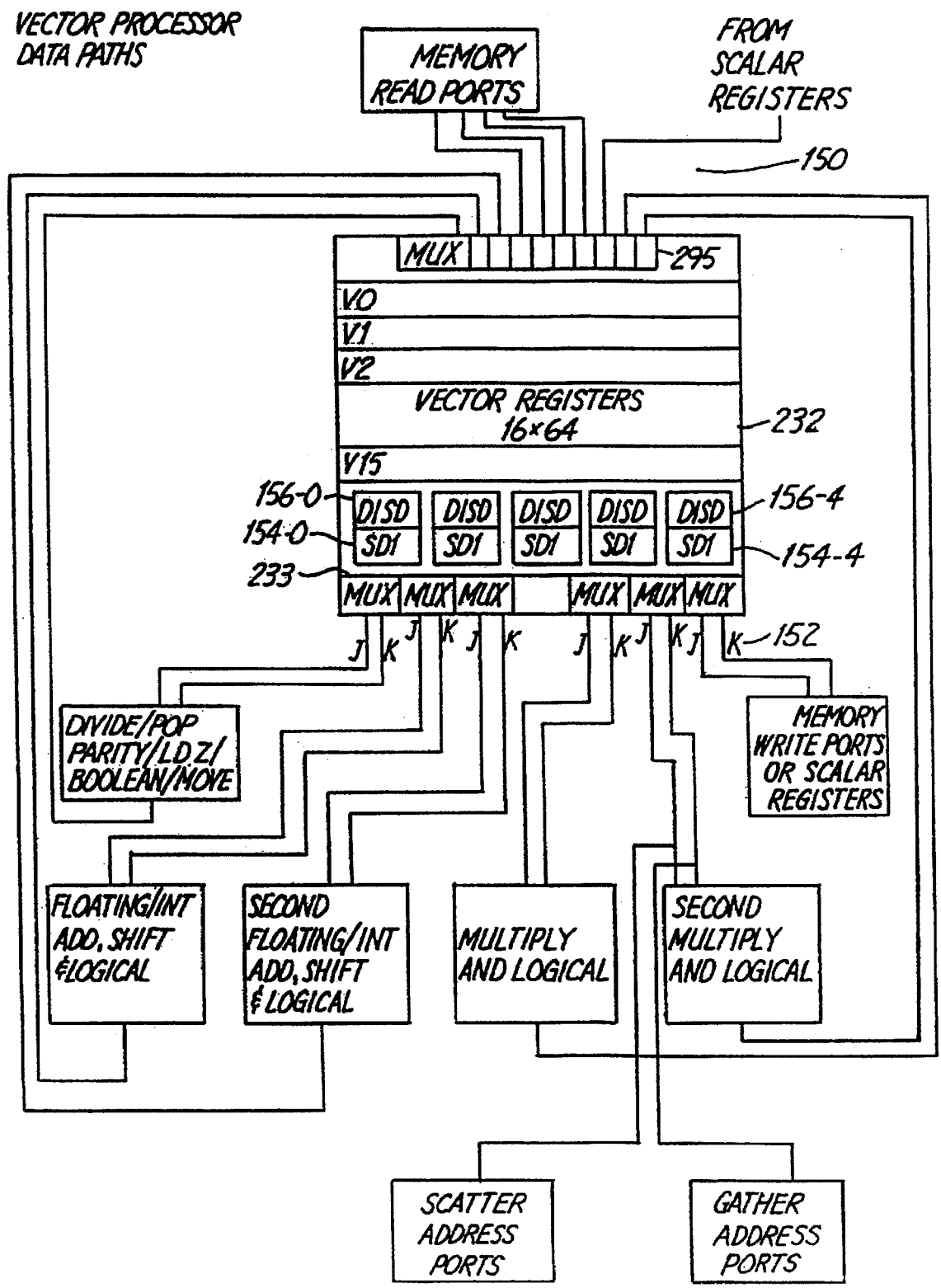
FIG. 6 illustrates the vector and scalar registers within the vector register unit and the input and output paths of the unit.

Referring now to FIG. 6, the vector register unit 232 and its instruction control mechanisms will be described.

The vector control logic 130 interfaces with the instruction issue and memory interface logic. This logic includes multiplexors (not shown) for controlling ten 64-bit data path inputs 150 and the twelve 64-bit data path outputs 152 of the vector register unit 232.

The ten 64-bit data path inputs to the vector registers are coupled to

Memory load port 116-0

Memory load port 116-1

Memory load port 116-2

Memory load port 116-3

Scalar registers 204

Add, shift, and logical functional unit VU3

Add, shift, and logical functional unit VU4

Multiply and logical functional unit VU1

Multiply and logical functional unit VU2

Divide, pop count, parity, leading zero, and boolean functional units—VU0

The twelve 64-bit data path outputs from the vector registers are coupled to

Scalar registers 204

Memory store port 0/scalar registers 118-0

Memory store port 1/scalar registers 118-1

Divide, pop count, parity, leading zero, and boolean functional units VU0

Add, shift, and logical functional unit VU3

Add, shift, and logical functional unit VU4

Multiply and logical functional unit VU2/Gather and Scatter address ports (9 and 10)

Multiply and logical functional unit VU1

The unit 232 includes sixteen vector registers V0–V15 and a group of scalar registers 154-0 to 154-4, one for each functional unit VU0 to VU4. A 16:1 multiplexor (not shown) couples register outputs to the j field inputs of the functional units VU0 to VU4, to the data write ports 118 and scalar registers 204 and to the scatter/gather ports. A 17:1 multiplexor couples V register outputs or the outputs of registers 154-0 to 154-4 to the k field inputs of the functional units VU0 to VU4 when one of the operands of a currently executing instruction is either vector or scalar respectively. A second set of scalar registers 156-0 to 156-4 is provided for scalar data of dependently initiated instructions in the queue of each respective functional unit VU0–VU4. As each dependently initiated instruction is advanced for execution in its functional unit, its scalar data is moved from its register 156n to the corresponding register 154n. These registers are filled from the five registers in a manner described later.

Each vector register (V0 to V15) may be read from and/or written to once per clock. This means that a single vector register cannot be supplying operands for more than one instruction at a time or be receiving results from more than one instruction at a time. A vector is "reserved for reads" if it is currently being read; this holds off the start of another instruction that will read that register. Similarly, a vector register is "reserved for writes" when it is the target result register of a currently executing instruction; this blocks the start of a subsequent instruction that would write to that register.

However, a single vector register may supply two operands to a single functional unit, if that register is specified by both j and k fields of a valid vector instruction.

The vector control logic 130 also provides the mechanism for chaining multiple vector instructions together. This means that an instruction to read from a vector register may initiate while another instruction is writing data into that register. Vector control ensures that the new instruction will not get ahead of the previous instruction which is supplying it with data.

If a vector register is "reserved for reads," another instruction to write to that register is not initiated. When the previous read completes, there are several cycles of overhead and then the write into the vector register may start.

System Overview—FIGS. 7A–7H

The improvement of the present application accelerates scalar and vector processor performance and efficiency by providing substantial new means with which to pipeline and chain numbers of processing functions. The present improvement achieves additional processor efficiency by putting distributed control mechanisms at the levels of the elements and sub-elements which control data actions during processing functions. It will thus be seen that both the scalar processing unit 102 and the vector processing unit 104 are comprised of a plurality of pipelines, each of which are filled, monitored, and controlled cycle-by-cycle to achieve efficient system operation.

The applicant has laid out a diagrammatic view of the vector processing unit 104 in FIGS. 7C–7H, showing the relative clock cycle positions in which processing elements can operate as a vector instruction is initiated and executed by succeeding clock cycles. The portions of FIGS. 7A–7H which relate to scalar operations are similarly laid out with respect to their pipeline time cycles in terms of succeeding system clock cycles.

The vector initiate pipeline logic is designated as time v0, the beginning of a vector operation, and its pipeline runs though to time v6, at which time the vector register read operations can occur.

For example, a multiply operation in functional unit VU1 or VU2 runs to time v16. A divide operation in functional unit VU0 runs to time v50. Note that each time unit equals a system clock cycle. Therefore, if no delay occurs in the control and actions of the involved pipelines, it is possible that a multiply instruction can begin producing outputs sixteen clock cycles after the vector initiate operation in logic 250 takes place.

The capability of each of the pipelines coming out of the vector registers is improved by including multiple arithmetic and logic units in each path. Multiply functional units do multiplies, floating point multiplies, integer multiplies, and logical operations as well. Add pipelines can do shifts, adds logicals, floating adds and substracts, integer adds and substracts, fix-to-float, float-to-fix, and vector conditioning.

A more detailed description of the major component parts of the processor 100 and its internal inter-connections is now given with respect to FIGS. 7A to 7H. Instruction data and tags are entered into the port 112 from the arbitration node 44 as explained in the co-pending parent application. The instructions and tags are entered into the instruction cache 110 by way of holding elements 200 which form the input pipeline for the instruction cache. An instruction fetch means including a program counter 126 transfers instructions in sequence to a pipeline including register holding elements 201 and 202 which form a pipeline between the instruction cache and the instruction decode and issue mechanism 122. The issue mechanism includes a decode portion 122a and an issue portion 122b. A single stage holding means 203 couples the decode and issue mechanisms.

It is important that the issue mechanism responds to the decode of an instruction and issues that instruction for execution irrespective of whether it is a scalar instruction or a vector instruction, or a combined scalar/vector instruction. In order to issue a scalar instruction, the issue mechanism checks the status of operand data in the S registers and the availability of L registers required by the instruction to determine if they are, in fact, available for use. A scalar scoreboard storage device 203 of a type well known in the art maintains the status of operand data in the S registers 204. If the issue mechanism determines that the operand data and L registers required by the instruction are in fact available for use, the issue mechanism 122b provides an issue output on line 122c. This line is coupled with the S register addressing means, the scalar functional units, path selection means and other scalar processor resources which are required to execute the decoded instruction. In the event that the issue mechanism 122B determines from the decoded instruction that it is a vector instruction, it determines from a counter 206 whether or not a buffer queue 132 for storing vector instructions is full. If the count indicates that the queue is full, no further instructions may be issued until the queue has an open slot. If the queue is not full, the vector instruction is issued and transferred to the queue 132. If the instruction decoded is a scalar/vector instruction, i.e., it calls for a a scalar register as a source of an operand or a memory address, then the issue mechanism determines from the scalar register scoreboard whether the required scalar data is available and also determines from the counter 206 whether or not the queue 132 is able to accept another vector or vector/scalar instruction. If the scalar data is available and the queue 132 can accept the instruction, the scalar/vector instruction is transferred to the queue 132.

The S registers 204 are coupled to scalar functional units SU0 to SU2 inclusive by way of paths including a multiplexer 210 and holding pipeline stages 212 and 213.

Figure 7B:
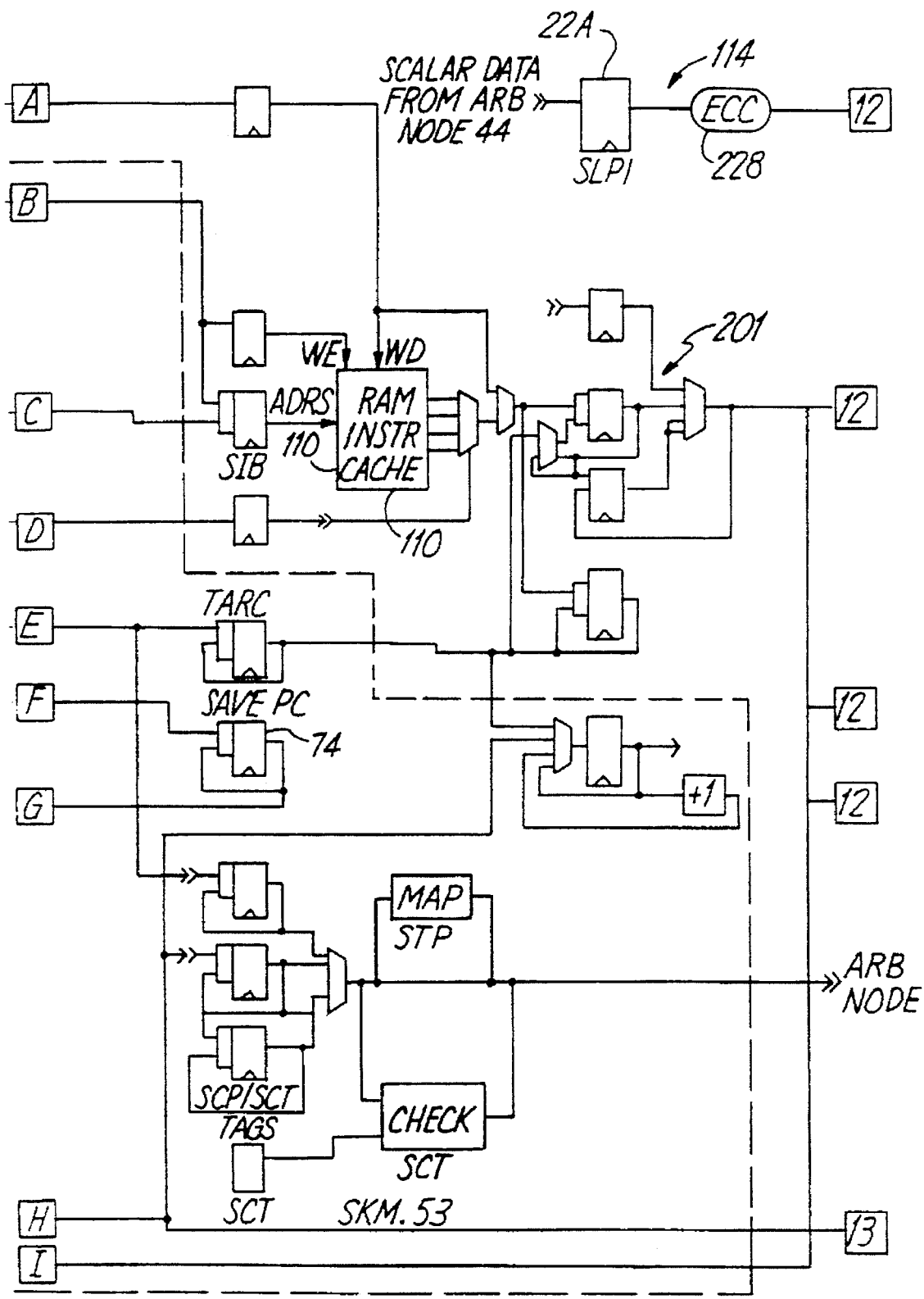
FIGS. 7A–7B and their organization in FIG. 7 is a block diagram which illustrates the primary components of the improved processor, the data and logic flow through the components in the relative time sequences in which the components are active.
Figure 7C:
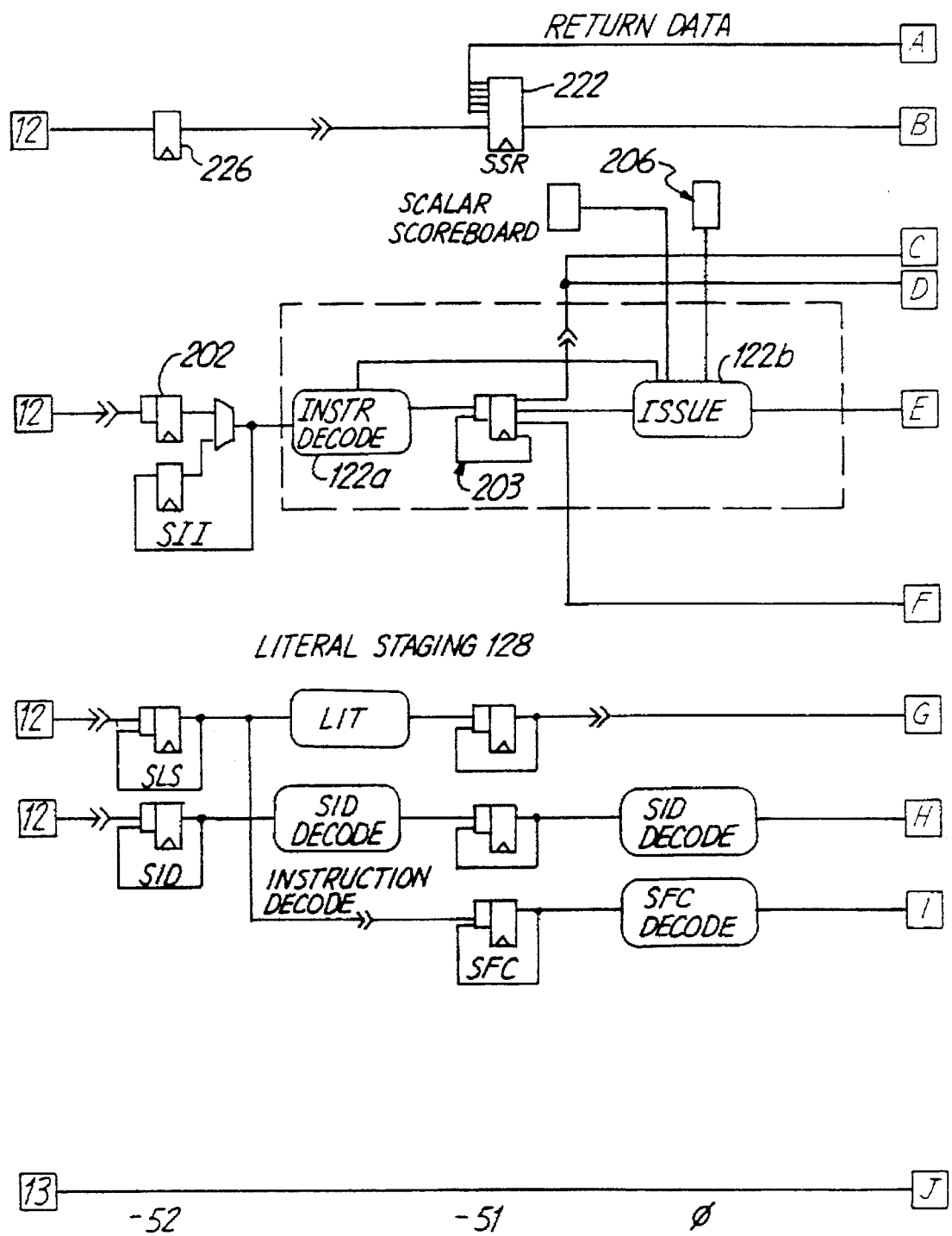
Figure 7D:
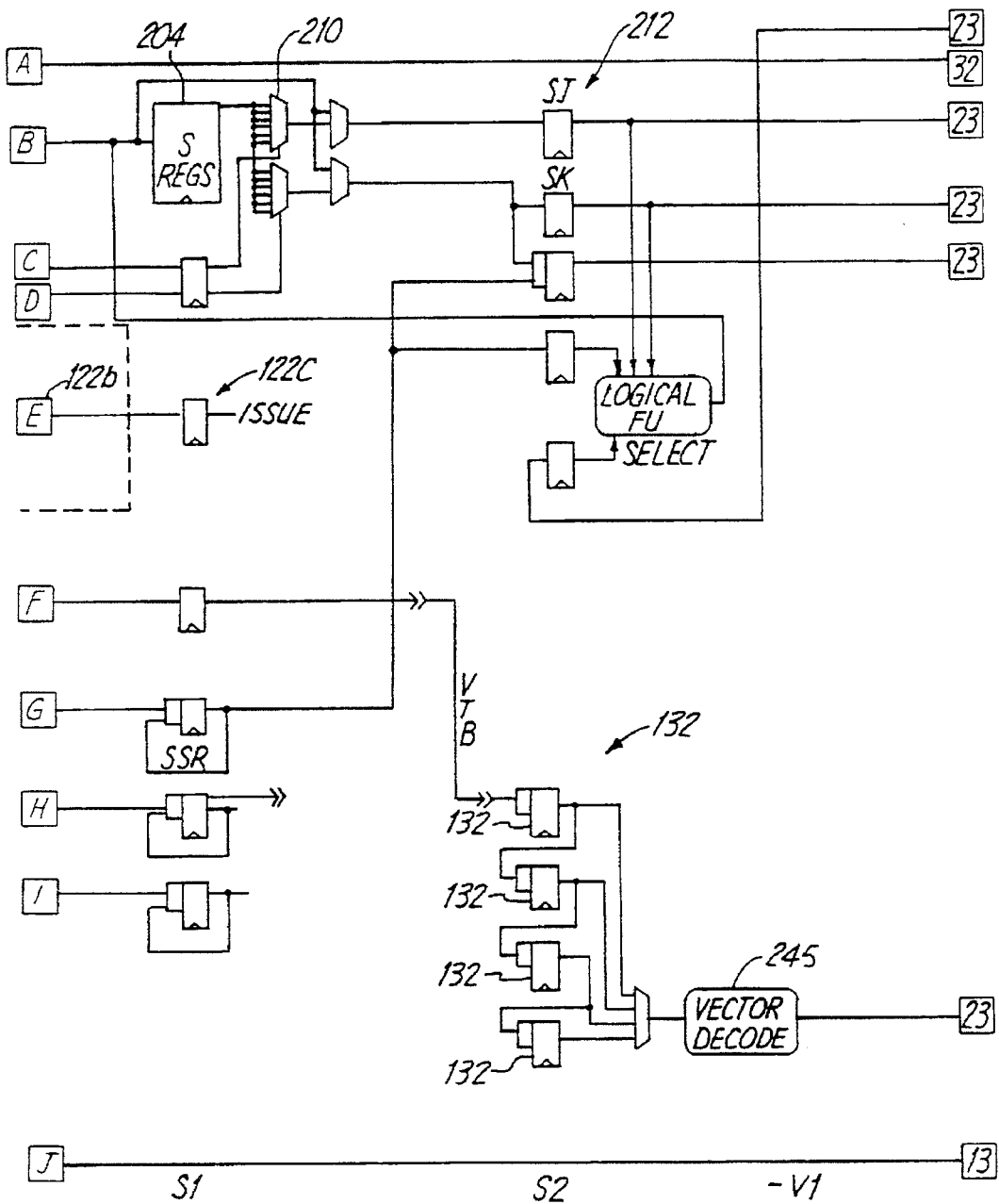
Figure 7E:
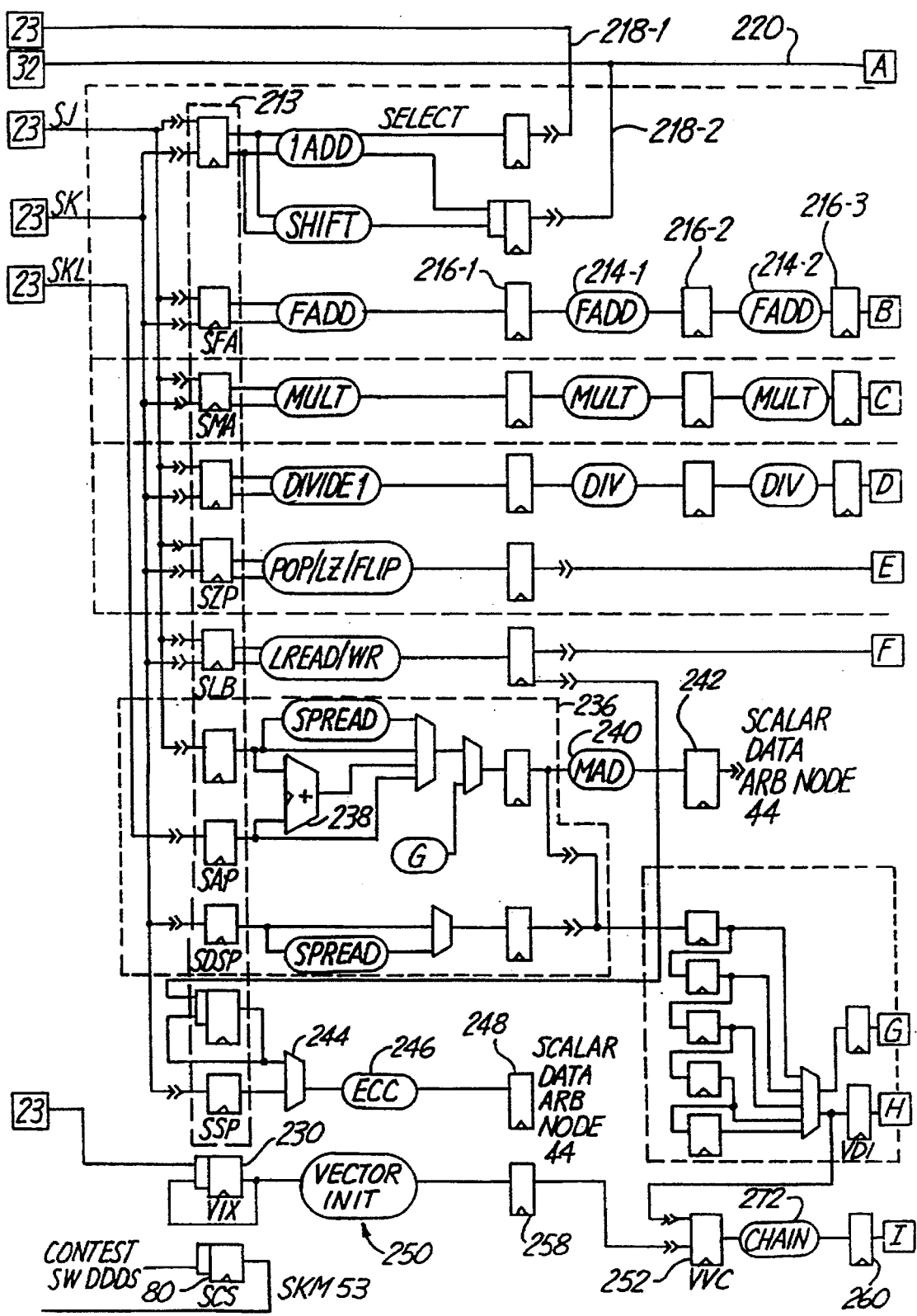
Figure 7J:
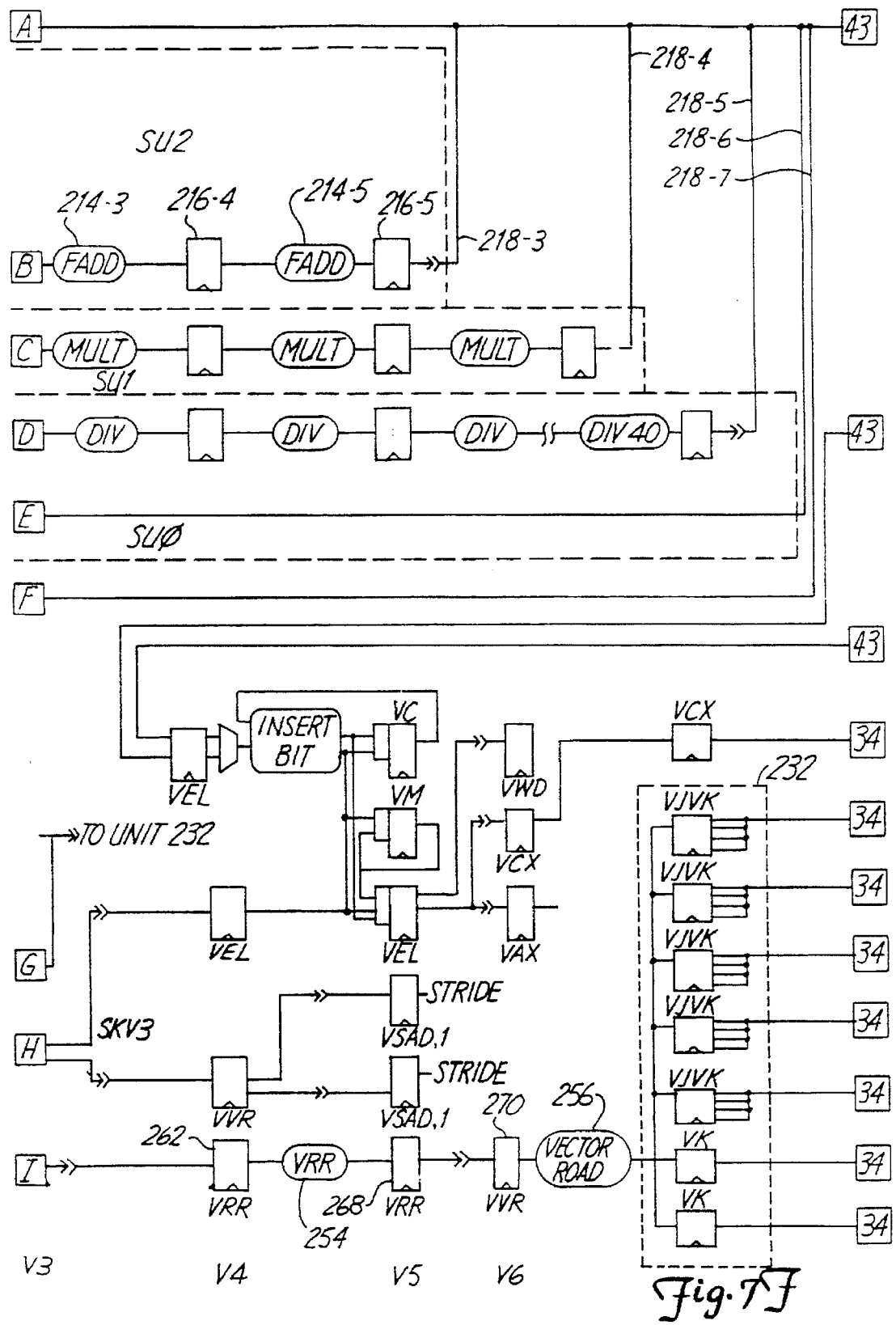

Each of the functional units SU0 to SU2 includes pipelined stages as shown in FIGS. 7E–7F. For example, the floating point addition unit in SU2 includes stages 214-1 to 214-4 with appropriate pipeline holding means to 216-1 to 216-5 between the stages. The outputs 218-1 to 218-7 of the scalar functional units are coupled back to the input of the S register 204 by way of bus 220 and the holding means 222 in FIGS. 7C–7D return the results of operations performed by the functional units.

This holding mechanism 222 is also in the path of the scalar data port 114 and the pipeline holding means 224 and 226. The scalar data port 114 receives scalar data from main memory by way of arbitration node 44. An error checking and correcting mechanism 228 provides data integrity to the scalar data being received from the arbitration node.

As indicated earlier, succeeding vector and scalar/vector instructions received from the decode mechanism upon issuance by the issue mechanism 122B are entered into a queue 132. The queue 132 shown in FIGS. 7C–7D illustrates only four stages; 132-2 to 132-5. The queue in reality includes five stages, the fifth stage being the register 230 shown in FIGS. 7E–7F. As succeeding vector and vector/scalar instructions are issued, they flow through the queue 132 into the register 230 in sequence because it is required that each of these instructions be "initiated" in sequence because it is required that each of these instructions be "initated" in sequence. As will be seen in detail later, these instructions must be prepared for execution in the same sequential order as they are issued. This preparation for execution is called initiation in the present application and it includes a two-stage set of events, the second of which will be referred to in the present application as "dependent initiation". These features of initiation and dependent initiation together permit the actual starting of the execution of the sequential instructions in the vector functional units VU0 to VU4 in an out-of-order sequence. Because some of these vector, or more accurately, scalar/vector instructions require scalar operand data or scalar addresses, there is provided in the vector unit 104 a five-stage queue 233 (FIGS. 7E–7F) which temporarily stores scalar data required for corresponding scalar/vector instructions stored in corresponding stages of the instruction queue 132. The scalar operand data in the queue 233 is transferred to the vector register unit 232 of FIGS. 7E–7F and FIG. 5a as its instruction is initiated.

The scalar data for the queue 233 is provided from the S registers 204 by way of the multiplexing unit 210, the holding means 212, and a pipeline holding means and arithmetic means 236. In some instances, the j and k fields of a main memory fetch or store instruction are added together to obtain a memory address with this addition done in the adder mechanism 238 in the circuit 236. It will be noted that the means 236 also provides the scalar addresses to the arbitration node 44 by way of a mapping mechanism 240 and an additional pipeline holding means 242. Scalar data is passed from the S registers 204 to the arbitration node 44 by way of the scalar data port 114 which further includes part of the holding means 213, a gate 244, error checking and correcting code means 246 and a holding means 248.

Returning to the vector and scalar/vector queue 132, it will be noted that the vector decode mechanism 245 precedes register 230. In the preferred embodiment, various fields and bits of a vector or scalar/vector instruction, which is ready for initiation, are rearranged and distributed throughout the vector unit controls for more rapid interaction with the control logic of the vector unit 104. The control logic of the vector unit 104 includes the register 230 (FIGS. 7E–7F), vector initiation (and dependent initiation) logic 250, vector control VVC registers and logic 252, vector read redistribution logic 254 and vector read logic 256 separated by pipeline holding elements 258, 260, 262, 268, 270. In addition, a mechanism 272 associated with the VVC registers provides for chaining when the results of one vector operation being performed in one of the functional units are required as operands in another functional unit for an operation related to a succeeding vector instruction.

The vector register unit 232 of FIGS. 7E–7F has been described in greater detail in FIG. 6. Briefly, vector registers and/or scalar registers within the unit 232 are selectively coupled by way of multiplexors to the various vector functional elements within functional unit paths VU0 and VU4 inclusive of FIGS. 7C–7H. Each of the vector functional elements within VU0 to VU4 include a plurality of stages separated by information holding means to form a pipeline. Thus the floating point addition element 280 of VU4 including six stages of floating point addition logic 282-1 to 282-5 separated by holding means 284-1 to 284-6. The integer add unit 290 includes integer add stages 292-1 and 292-2 separated by holding elements 294-1 to 294-3. The outputs 297 of the units VU0–VU4 are applied to the inputs of vector register unit 232 by a multiplexor 295.

Attention is directed to the fact that the outputs of the floating point add and the integer add elements are both connected to the same output 296 which, in certain combinations of instruction types, can lead to an output conflict. For example, if we attempt to use the functional unit VU4 to dependently initiate the execution of an instruction while VU4 is already executing a function called for by a previous instruction, it must be noted that an output conflict can occur if the second instruction to be applied to VU4 is an integer add instruction while the first (currently executing) instruction is a floating point add instruction. Conflict could occur if the output of the integer add appears at the output 296 before all of the outputs of the floating point add clear the output circuit 296. On the other hand, we want to keep all of the pipelines filled, therefore, in the initiate and the dependent initiate logic, means have been provided which control the application of same instructions to VU4 so as not to result in a conflict. Similar potential conflicts exist in VU3, potential logical/multiply conflicts exist in VU1 and VU2, and potential conflicts exist between the divide and Boolean or pop elements of VU0. Conflicts are resolved by requiring that each dependently initiated instruction have an execution pipeline length equal to or greater than that of the preceding instruction in the same functional unit.

It will also be seen in FIGS. 7E–7H that the vector registers are also selectively coupled to the vector write ports 118 which include pipeline holding elements 298. Vector read ports 116 are coupled to the V register input multiplexor 295 via pipeline holding elements 299 and error checking and correcting circuits 301.

Figure 7G:
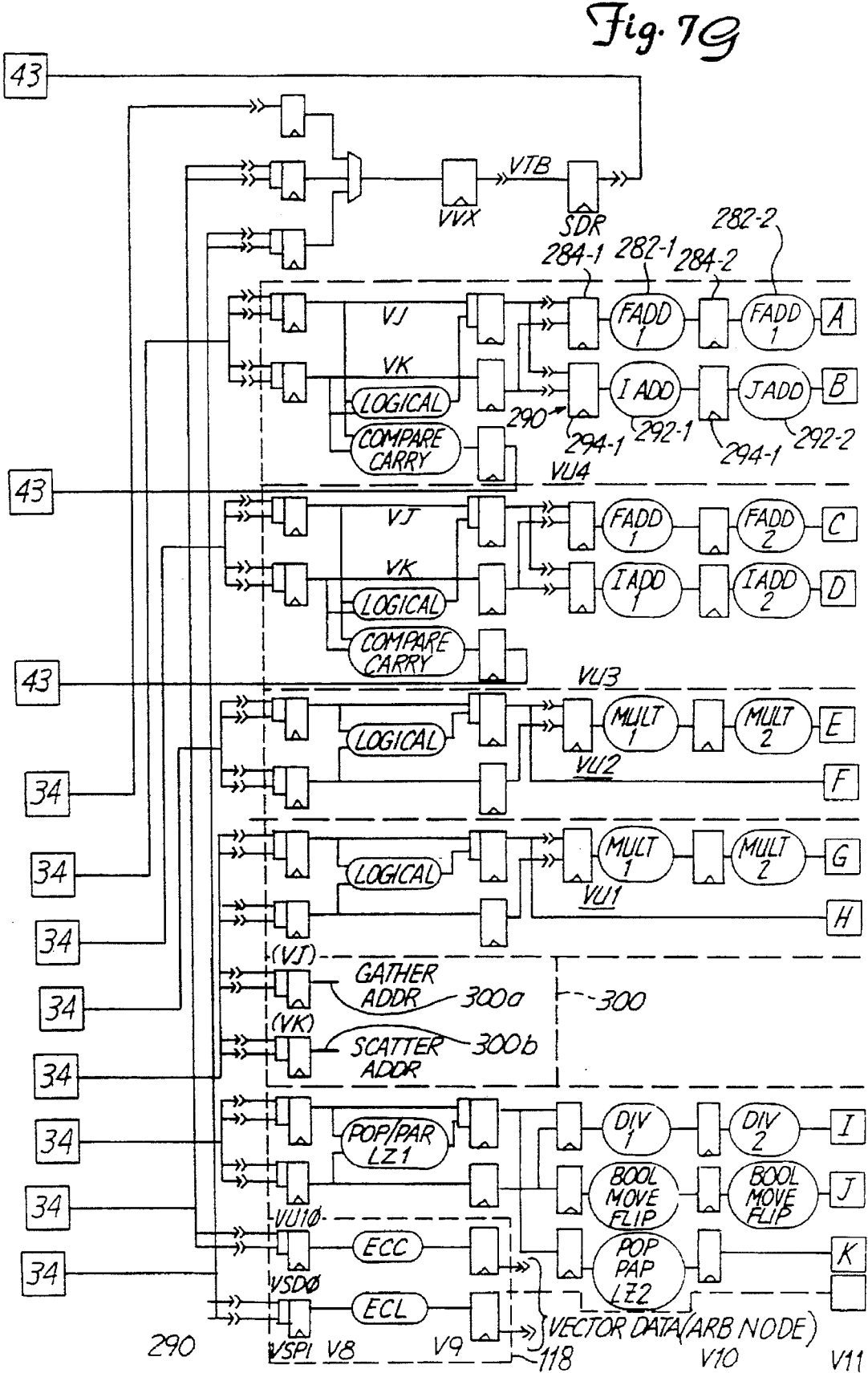
Figure 7H:
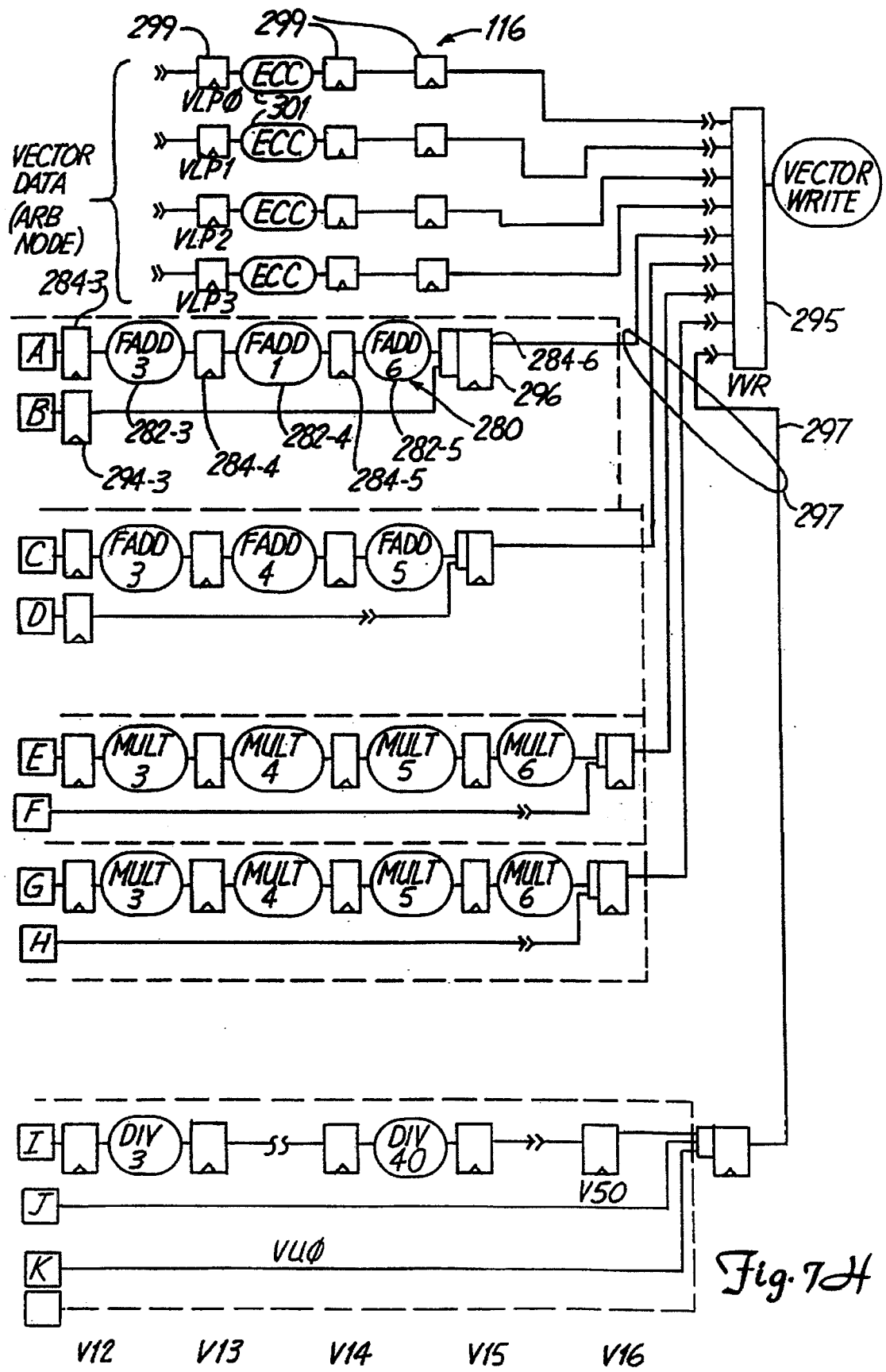

The output of the vector register unit 232 is also selectively coupled to the gather/scatter address ports 300, FIGS. 7G–7H.

It is thus seen that both the scalar processing unit 102 and the vector processing unit 104 are comprised of a large plurality of pipelines, each of which must be filled cycle after cycle to the extent possible if efficient system operation is to be achieved.

The vector unit pipeline starts with the vector decode and vector initiate logic—the vector initiate logic being selected as time v0 or the beginning of a vector operation—and its pipeline running through to time v6 at which time the vector read operations can occur. The vector and/or scalar register data can then be applied to the functional units which are also pipelined. For example, the multiply unit elements in units VU1 and VU2 run to v16. The divide unit runs v50. Each of these units is the time period of a clock cycle. Therefore is could be possible (if there were no delay in the action and controls) that a multiply instruction could begin producing outputs in sixteen clock cycles after the vector initiate operation in logic 250 took place or 19 clock cycles from decode of the instruction in the scalar instruction fetch and decode unit 120 (FIG. 2). The scalar unit 102 and vector decode 245 use three of the 19 cycles. It can be seen, therefore, that applicant has laid out a diagrammatic view of the vector processing unit 104 in FIGS. 7C–7H in the clock cycle positions in which the elements can operate as the instruction is initiated and executed by succeeding clock cycles. The portions of FIGS. 7A–7P which relate to scalar operations are similarly laid out with respect to their pipeline time cycles in terms of succeeding system clock cycles.

Figure 8B:
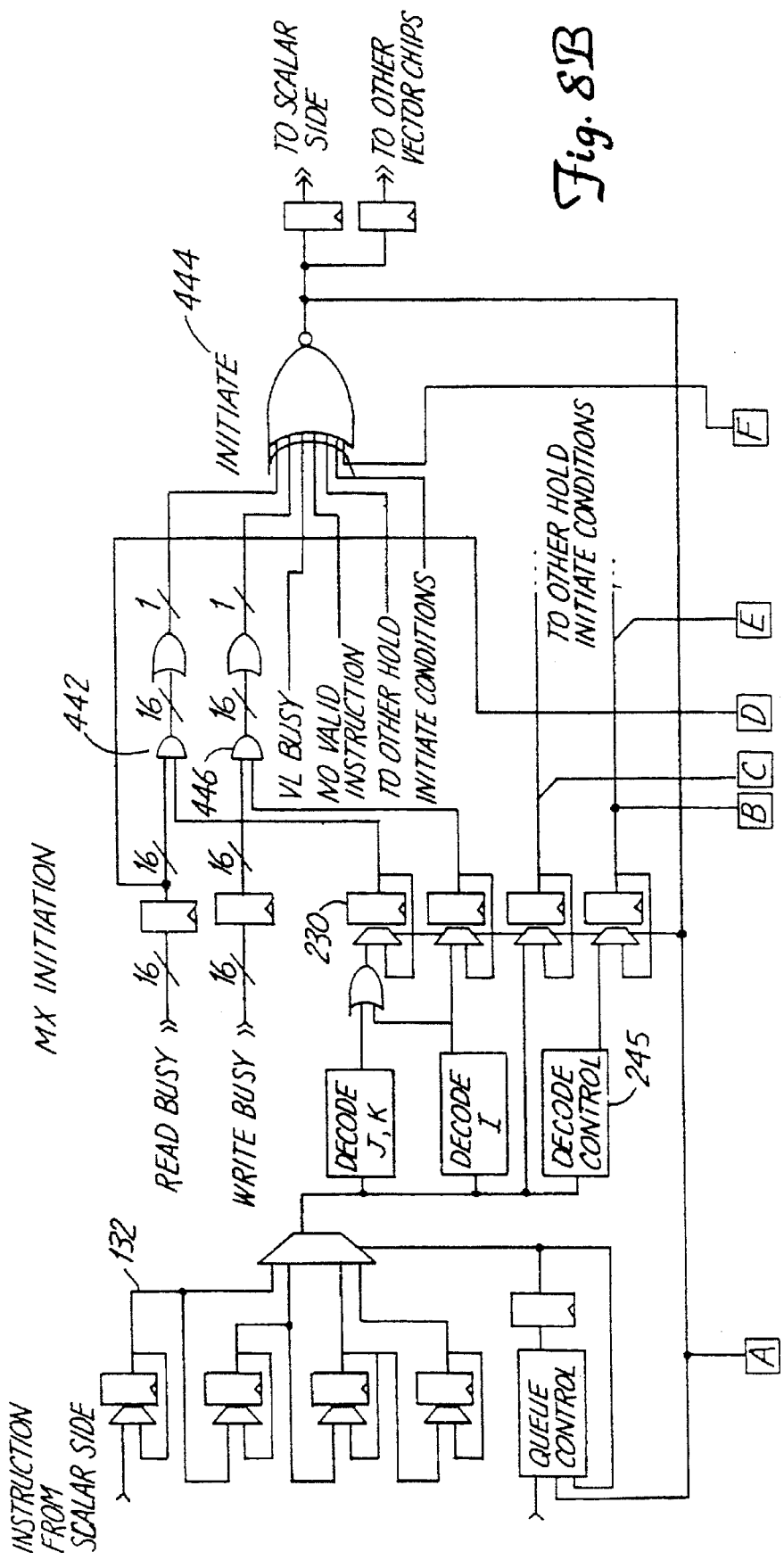
Figure 8C:
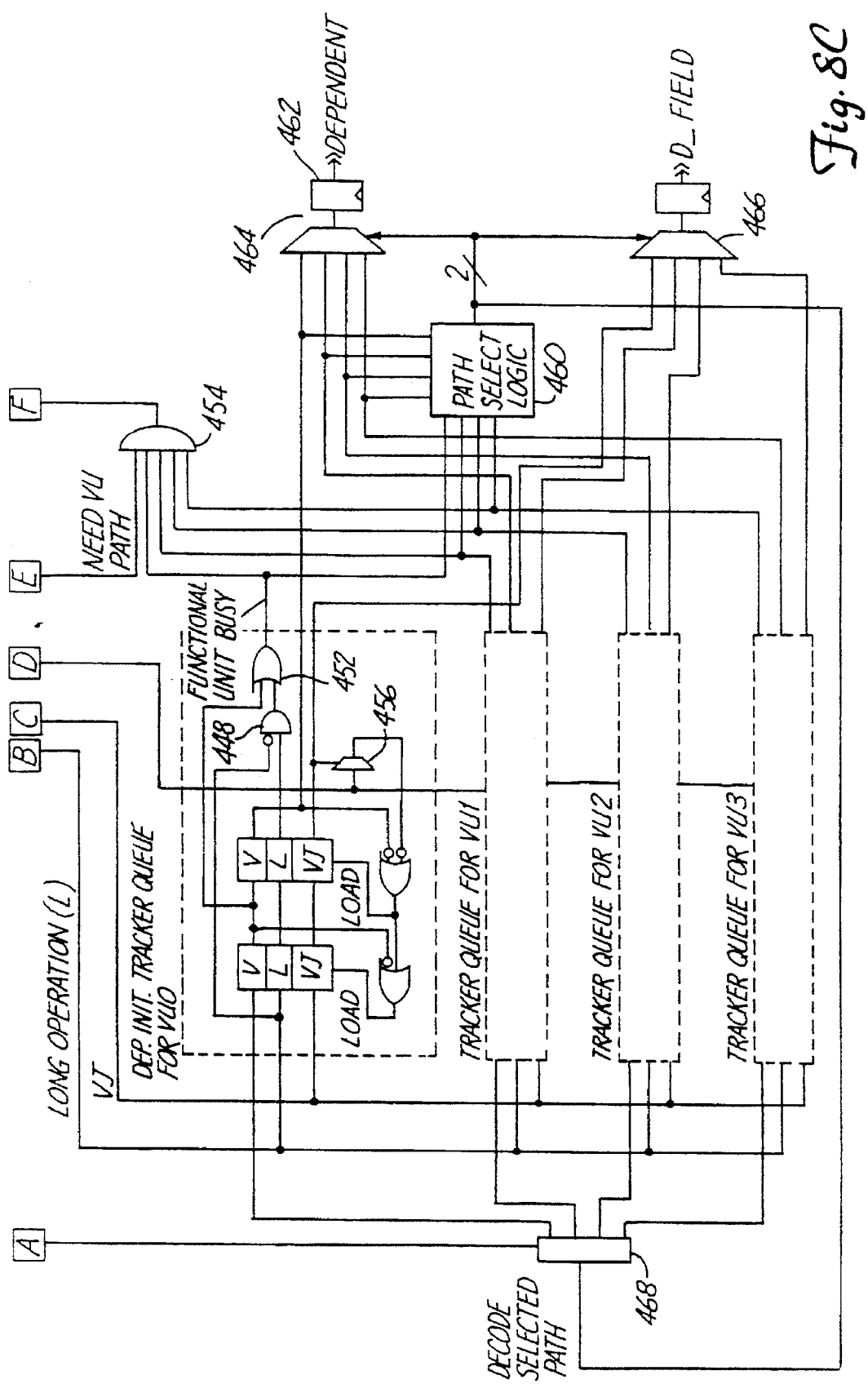

Initiation Logic—FIGS. 8A–8C

The "initiation" feature of the present application is an improvement over the prior art which was characterized by merely "issue" of both scalar and vector instructions, which required that all resources be available for issuance of either type of instruction. FIG. 8A briefly illustrates in diagrammatic form certain of the conditions required to initiate (normally or dependently) a vector instruction. FIGS. 8B–8C shows the initiation process and logic 250 in more detail. FIGS. 8B–8C implies four possible paths for the new instruction function.

The initiation feature significantly unblocks the scalar/vector instruction pipeline by permitting the issue of vector instructions if its required scalar data is available and if the vector instruction can be moved to a vector instruction queue, i.e., the queue is not full. Availability of the vector resources and functional unit is not required. From this queue, vector instructions are decoded in the order received and "initiated" if the functional unit or vector data port is available, the instruction destination register is not read or write busy, and the instruction source register(s), if any, are not read busy as seen in FIG. 8A. Meanwhile, queuing the vector instructions avoids much blocking of the issue mechanism, permitting significantly increased numbers of scalar instruction issues for execution.

The preferred embodiment of the present application includes an additional improvement to this issue/initiation feature. This improvement is referred to in this application as "dependent initiation."

This "dependent initiation" feature carries the issue/initiation feature of the present application a step further—vector instructions may be initiated (but dependently) even though the functional unit or vector read/write data port of the instruction is in use by a previous instruction execution and therefore not available as seen in FIG. 8A. Actual commencement of the processing of the vector data of the instruction will not occur until completion of previous instruction, i.e., the loading of the functional data path with operand data is completed. Thus, the instruction initiates even though its commencement is "dependent" upon completion of a previous instruction.

The dependently issued instruction may begin processing of its operands in the cycle following completion of the previous instruction with no gap in the data pipeline of the functional unit. To achieve this, the switch from one instruction to the next is performed first, and updating of the functional unit status is performed afterward.

It will be seen later that dependent initiation instruction queues are provided for the five functional units, the two write ports and the gather port. Status data in each queue relates to the currently executing instruction held in an active position in the queue and to status relating to another dependently initiated instruction which may be held in a backup position in the queue.

However, the process of initiating instructions, normally and dependently, also involves the use of priority hardware to first search for a free path for execution if there is more than one path provided for its function, e.g. if two multiply paths exist. The paths are assigned relative priorities for selection and means are provided for busy paths to be assigned for dependent initiation on a least recently used algorithmic basis.

In addition, because multiply functional elements are provided in each functional unit path (such as a logical element and a multiply element) and because the elements have different pipeline lengths, data collisions at the unit output could occur for a first multiply instruction followed by a dependently initiated logical instruction. Therefore, the initiation logic provides a means to compare the relative long or short pipeline lengths of current and dependently initiated instructions. Only if the instruction to be dependently initiated has a pipeline equal to or longer than that of the current instruction is it dependently initiated.

The decode logic 245 (FIG. 8B–8C) applies the Vj, Vk and Vi fields of the decoded instruction to logic which places signals on three lines in bus 440 corresponding to the field values. These lines and corresponding read busy lines from the VVC registers are applied to AND gates 442. If the corresponding VVC lines are not read busy, the AND gate outputs applied to the initiation gate 444 to satisfy one of the conditions of the initiation logic test—i.e. the operand and result registers are not busy.

Similarly, the decode logic also applies the Vi field to an AND gate 446. If the corresponding write busy line from VFX (FIG. 13a, b) applied to gate 446 is not write busy, a second condition of the invention test is satisfied—i.e. the result reigster VL is not write busy, Vi busy and "no valid instruction" inputs to logic 444 satisfy third and fourth conditions of the initiation when they are inactive.

Figure 11:
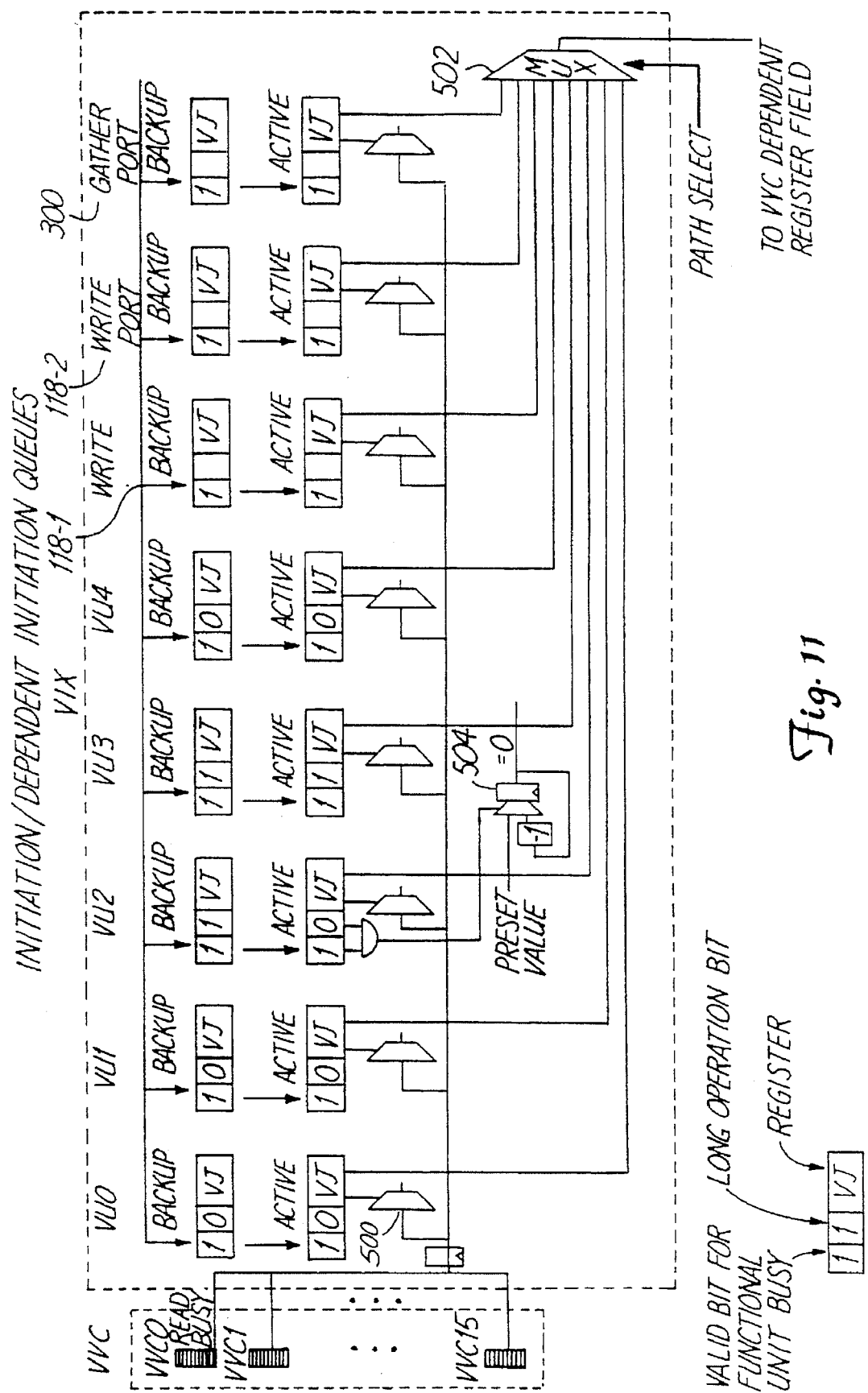
FIG. 11 illustrates the initiation (dependent initiation) queues and their coupling to the VVC registers.

The Vj and pipeline length (L) field bits of the decoded instruction are applied to the active and backup stages of the dependent initiation queues (also referred to as "trackers") which are shown in greater detail in FIG. 11.

The decode 245 decodes the control bits of the new instruction to determine if the functional unit operation is long or short and applies the signal to a logic gate such as 448 of each functional unit queue. If it is long, it inhibits the gate 448; and the conflict condition is resolved for this operation. If it is a short operation, and the current instruction is long, gate 448 passes an output signal to gate 454 implying an unavailable functional unit. If all possible paths for the new instruction are inhibited by similarly applied signals to gate 454, initiation of the new instruction would be held up because all four possible paths for executing the function of the new instruction are unavailable for use. This gate 448 is selected for the initiation test by the opcode input from decode 245. Similar gates are provided for other operations.

If valid bits in both the active and backup positions of a selected queue have valid bits at "1", indicating current and dependently initiated instructions for the functional unit, gate 452 passes an output signal to gate 454; if all available paths are similarly filled, the gate 454 holds up initiation of the instruction.

The logic for loading the backup and active positions in the queues is also illustrated. When a corresponding read busy signal from a VVC register is reset to "0" (the current instruction is complete), the Vj value in the active position (or in the backup position if it is filled) control the MUX 456 to load the new V, L and Vj data into the backup position, and, if the backup position had been filled, its data is moved into the active position.

The input lines to gate 454, which prevented initiation of an instruction if all four lines are active, will permit initiation if fewer than all four lines are active. A decision is then required for selecting the functional unit to which the instruction can be initiated or dependently initiated (all other tests having been satisfied).

These four lines (to gate 454) are applied to the path select logic 460. valid bits V in the queues (trackers) are also applied to the logic 460. With this data, the logic 460 selects a functional unit in accordance with the criteria described above, e.g. a free path preferable to a busy path, a higher priority path over one of lower priority, etc.

If the selected path is busy, the valid bit V will be gated to the dependent initiation output 462 by the selected path signal controlling the MUX 464. The Vj value in the active position of the selected unit identifies the dependency register for this new instruction; and it is gated by MUX 466 to the dependency register field in the VVC register corresponding to the Vj register of the new instruction. The initiate signal controls MUX 468 to cause the path select output to select the tracker and set the appropriate valid bit in the active and/or backup positions.

Dependent Initiation Queues—FIG. 11

FIG. 11 illustrates the initiation/dependent initiation queues for each of the functional units VU0 to VU4, write ports 118-1, 118-2 and the scatter port 300b. Each queue in the preferred embodiment is two deep, with one active position for an instruction currently executing and a second backup position for a dependently initiated instruction. Each position stores the Vj register number and a busy bit. The functional unit queues have a third bit to indicate long or short operations to avoid conflicts at the outputs. If there is an associated Vk coregister, an associated VVC register keeps track of the coregister but the coregister number is not entered into the queues.

When an instruction is initiated, its Vj register number is entered into the backup position of the functional unit or port which has been selected by the initiation logic to process the instruction, the busy bit is set, and at the next clock cycle it is moved into the active position for instruction execution. When a subsequent instruction is dependently initiated to the same functional unit or port prior to completion of the first instruction, its Vj register number is entered into the dependent initiation (backup) position and the busy bit is set. When the active position is filled, only a dependently initiated instruction can fill the backup position.

When the first instruction completes, the busy bit in the active position is reset, the Vj and long operation value in the dependent initiation backup position are moved into the active position; and the busy bit in the active position is again set. The dependent initiation busy bit is reset to permit a subsequent instruction to be dependently initiated to the same functional unit or port.

This update operation is initiated when the VVC register of the current instruction resets the ready busy signal. A multiplexor such as 500 produces an update signal at its output "if the Vj value in the active position corresponds to the VVC register which went non-read busy". This update also includes resetting the read busy bit in the V register scoreboard 450 (FIG. 12) corresponding to the vector operand register(s) of the instruction which is completing.

This arrangement of the interaction between VVC registers and the queues of FIG. 11 transform busy register status to functional unit status.

During dependent initiation, the VVC dependency register fields of dependently initiating instructions are loaded with the Vj number in the active position by means of a multiplexor 502.

A counter such as 504 resets the valid bit in the functional unit active queue position with which it is associated. It may be set at instruction initiate time to a value equal to the pipeline length of the long operation functional element in the path. When the last operands are entered into the input of the functional element, the counter begins decrementing on each clock cycle. When it reaches zero (the last operands are in the last stage of the functional element), the valid bit in the active position is reset to render the functional unit non-busy for selection in an instruction initiation operation.

This feature is used when operand collision at the output of a functional path would occur and dependent initiation is prevented. A subsequent initiation into said path must wait for the functional unit path to go non-busy. Hence, the counter permits an earlier non-busy status for the functional unit.

In a preferred embodiment, the initiation process delay can be subrated from the initialization value set in counter 504 to permit even earlier reuse of the functional unit.

Counters such as 504 are not provided for the write and gather ports.

An example of the use of these functional unit active queues during the execution of a number of instructions is shown and described with respect to FIG. 16.

Figure 9:
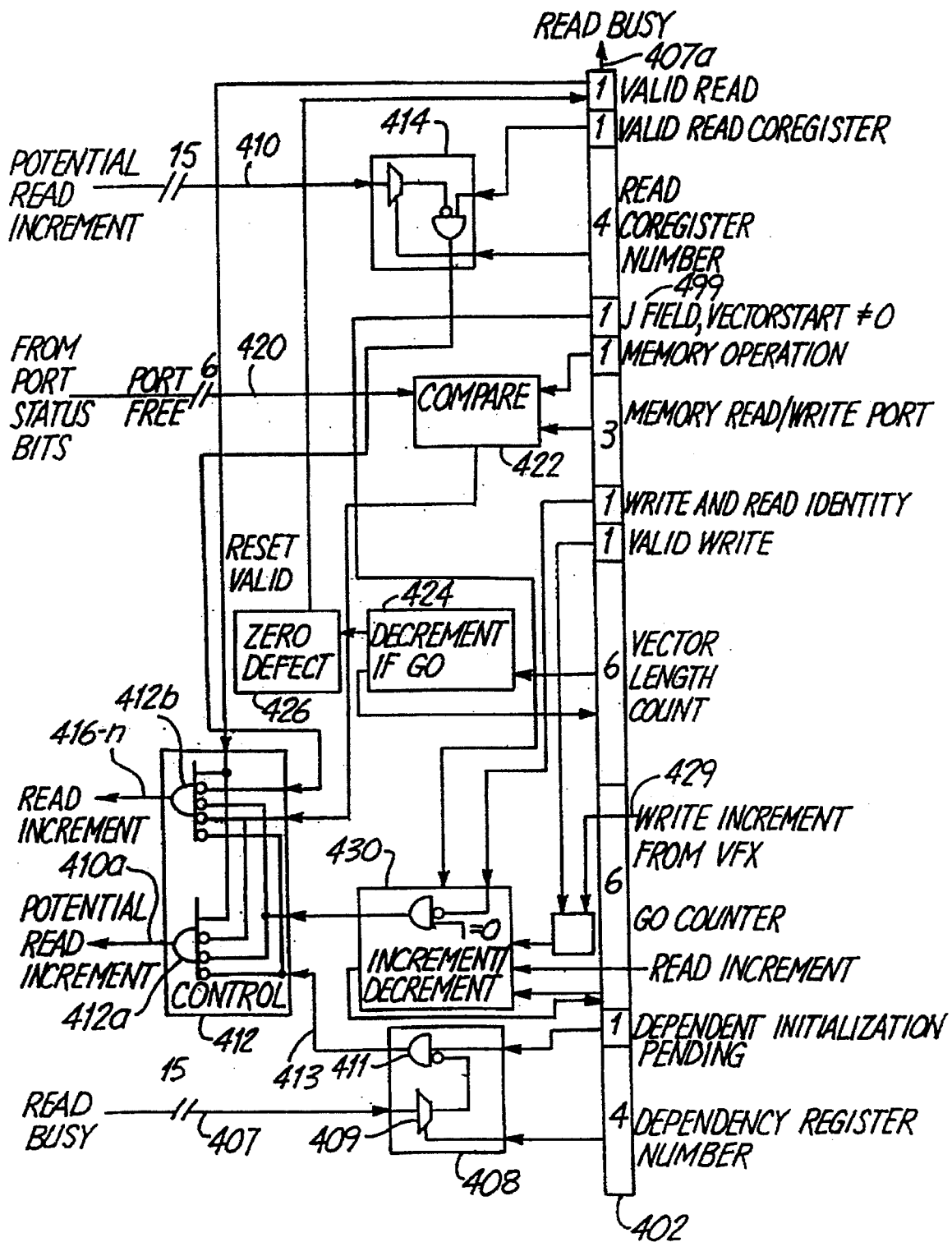
FIGS. 9 and 10 show a VVC vector read control register, its associated logic and their intercommunication.
Figures 10, 12:
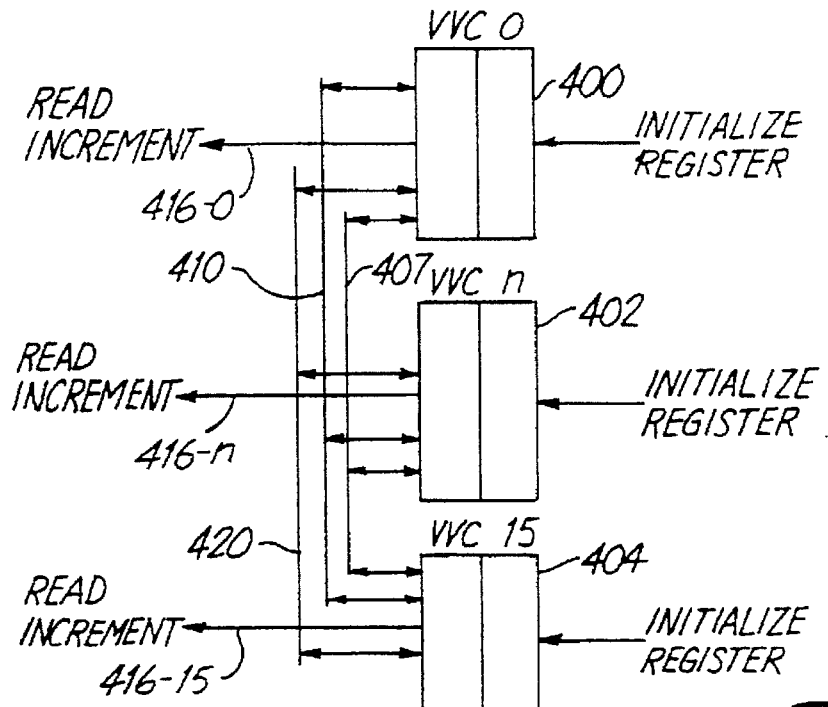
FIG. 12 illustrates the vector register scoreboard which stores the register read/write busy status.

Use of VVC Registers in Read Operations—FIGS. 7, 9 and 10

With particular reference to FIGS. 7E–7F, it will be seen that the VVC register/ logic 250 is placed between the vector initiation logic 250 (which has been described above with respect to FIGS. 8A–8C) and the vector register unit 232. Its primary function is to control access to the register unit 232 to read data from the vector registers element-by-element during instruction execution.

However because of the complexity of the vector unit 104, the operation of the VVC registers and logic becomes extremely complex. Because of the complexity, each VVC register is initialized at various times with data (valid read, FIG. 9) which indicates the busy or non-busy status of a corresponding vector register in unit 232. Each VVC register is permanently assigned to a corresponding vector register in unit 232. Other initialization data (valid read coregister and read coregister number, FIG. 9) relates to its "coregister" when it and the coregister are instruction operand registers. The coregisters keep track of each other's status. Still other initialization data relates to (1) initiating the reading from a vector register from an element other than the zero or first element in the register (vector start not equal 0), (2) port status during memory operations (memory operation and read/write port), (3) the instruction vector length (VL), (4) chaining control (GO COUNTER), and (5) dependency register number and status when it is an operand register for a dependently initiated instruction.

FIG. 10 illustrates diagrammatically the registers VVC0–VVC15 which correspond to vector registers V0–V15 in unit 232. Each register has associated logic which will be seen and described with respect to FIG. 9. The logic of the VVC registers is interconnected via read busy bus 407 having a read busy line originating at each VVC register and being applied to the logic of all other VVC registers. A "potential read increment" bus 410 includes a potential read increment line originating in the logic of each VVC register and being applied to the logic of all other VVC registers. "Read increment" lines 416-0 to 416-15 emanate from respective VVC logic circuits for directly controlling the addressing of respective vector registers. A "port free" bus 420 provides the busy or non-busy status of the vector ports 116 and 118 for use during read and write operations to memory.

Figure 13B:
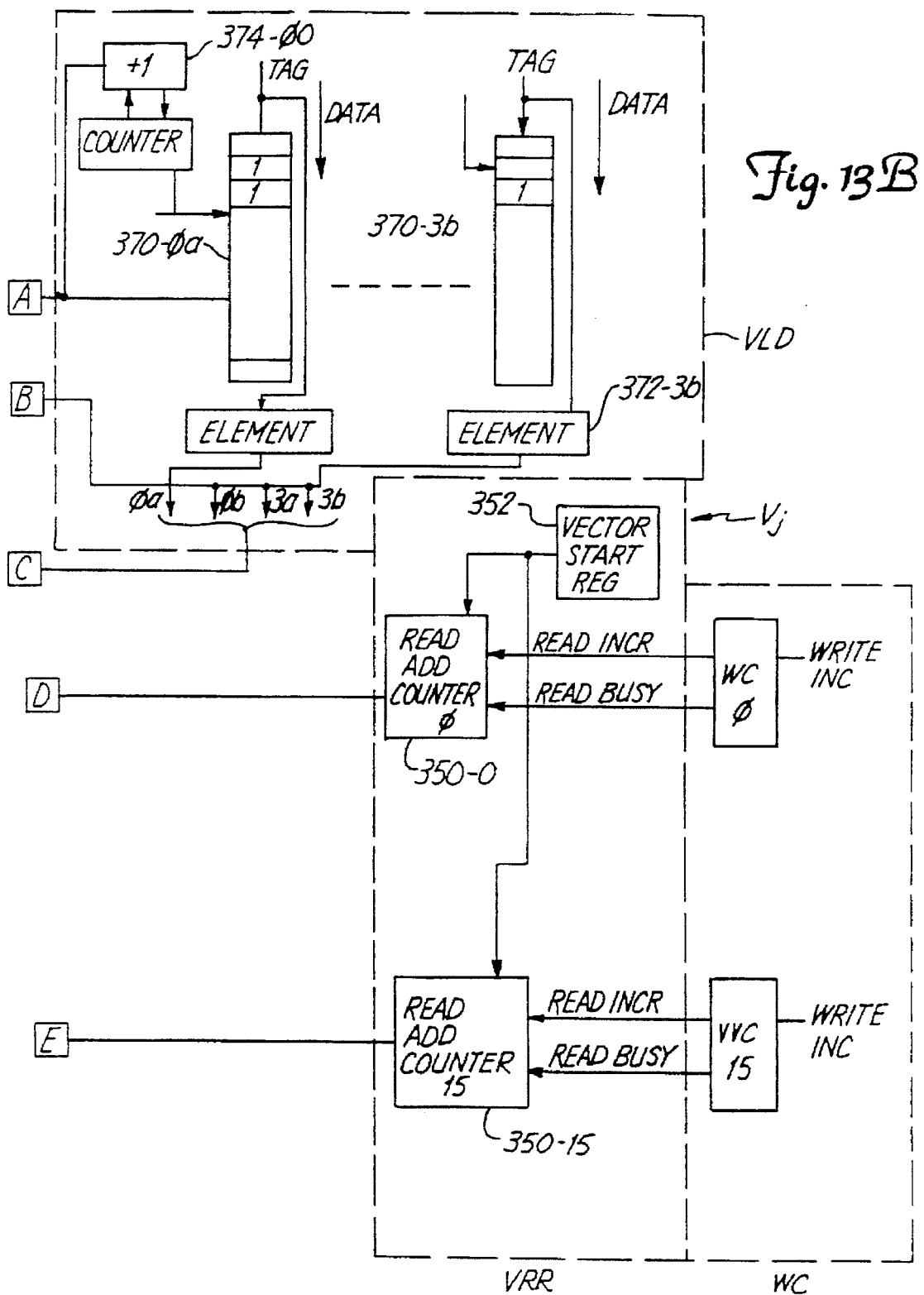

A description of the complexities of reading data from vector register elements will now be made. To appreciate the operation of the VVC registers, it must be noted that they interact closely with the vector initiation logic 250 (FIGS. 8B–8C), the dependent initiation queues (FIG. 11) and the vector register address logic (FIGS. 13a and 13b).

The VVC registers are provided to control the reading of operands from the vector registers V0–V15 of unit 232. Each VVC register is assigned to a respective one of the registers V0 to V15. Each VVC register therefore controls incrementing of the read address counter of its respective vector register, as will be seen in more detail with respect to FIGS. 13a and 13b. When two vector registers are called for in the operand fields Vj and Vk of an instruction, the corresponding VVC registers act as a pair to control their vector register read operations in an identical fashion. Logic associated with each VVC register assures that a vector element is not read unless the data has been previously entered into that vector element, for example during chained instruction operations.

Most importantly, however, when a second instruction is dependent initiated to a functional unit processing a current instruction, the VVC corresponding to the Vj operand of the second instruction acts to prepare the second instruction for execution during the clock cycle in which the current instruction feeds its last operand data to the functional unit, thereby signifying the termination of the current instruction. The operand data for the second instruction can therefore be fed to the functional unit during the next clock cycle with no gap in the functional unit pipeline. This assumes however that no other condition inhibits the second instruction data transfer. The VVC register of the dependently initiated instruction accomplishes this result by capturing the Vj register number of the current instruction, and monitoring a read busy output (on bus 407) of the VVC register which corresponds to the Vj register of the current instruction to determine when the current instruction read process terminates, i.e. the read busy output is reset to zero.

The bit fields, function and intercommunication between the VVC registers such as that illustrated in FIGS. 9 and 10, will now be described in more detail. A VVC register is a control register provided for a respective one of the V registers V0–V15 in the V register unit 232. The VVC registers and their associated logic together with the queues of FIG. 11, provide a means which avoids the need for the initiation logic to directly test each of the functional units and read/write ports for their busy or non-busy condition (as shown above with respect to FIGS. 8B–8C) before initiating an instruction. Each VVC register keeps track of the status and controls the addressing of its corresponding vector register when the latter is an operand of an initiated instruction currently executing in a respective functional unit or a read/write port. The VVC also monitors the status of a Vj operand register of a current instruction when the VVC corresponds to a vector operand register of a succeeding instruction dependently initiated to the same functional unit or read/write port. By maintaining the status of these registers, we indirectly maintain the status of the functional units and read/write ports insofar as their ability to receive operand data for a next instruction.

FIG. 9 illustrates the details of the VVC register fields and associated logic of the VVC register 402. A read busy output line 407a enters the bus 407 and the bus 407 is coupled to logic 408. A potential read increment line enters the bus 410 and the bus is coupled to logic 414. Port free bus 420 is coupled to logic 422.

For ease of illustration, FIG. 10 shows three VVC registers 400, 402, 404 corresponding to three respective V registers of unit 232. For purposes of this discussion, it will be assumed that register 404 corresponds to the V register in the j field of an instruction currently executing in a functional unit. Registers 402 and 400 correspond to the Vj and Vk operand registers of a next succeeding instruction (dependently initiated) to be executed in the same functional unit.

When the next succeeding instruction is dependent initiated to the functional unit, the number of the V register corresponding to VVC 404 (the Vj operand of the current instruction being executed in the functional unit) is captured by VVC 402. It is held in the dependency register number field of VVC 402 until it (the dependency register) delivers its last operand for processing, i.e., its vector length count VL in its respective VVC 404 goes to zero and read busy line from the valid read bit field in VVC 404 goes to zero. Read busy 407a is applied to logic 408 to energize the potential read increment line 410a via controls 412. In logic 408, each input line of bus 407 originates in one of the other VVC registers. If that VVC register corresponds to the dependency number in VVC register 402, its signal level is applied to the AND gate 411 by the value of the dependency number applied to the MUX 409. When the read busy line from VVC register 404 goes to zero, the inhibit input to gate 411 is removed which removes the inhibit input to gate 412a. The dependent initiation pending bit is reset.

The signal on potential read line 410a is applied to logic corresponding to 414 in VVC 400. VVC 400 has similar data in its dependency register number and dependent initiated field and responds in the same way as VVC register 402 to apply a signal to its potential read increment output.

The logic 414 in VVC 400 and 402 compare the signals on the bus 410 with the coregister numbers stored in their respective fields to confirm that both operand registers are available for use, and read increment signals on lines 416a and 416n are produced. The logic 414 is similar to logic 408. These signals causes the control data in dependent initiation backup control points in the functional unit to be advanced to the functional unit execution control points for processing of the dependent initiated instruction. Subsequent clock cycles produce incrementing of the vector register address registers corresponding to VVC registers 400 and 402. This gating of the read increment signals assumes no other inhibit lines to gates 412a or 412 b exist, e.g. a chaining inhibit signal.

These actions occur during the clock cycle in which the dependency register delivered its last operand for processing; and the Vj and Vk registers corresponding to VVC 402 and 400 are ready to deliver their first operands for processing during the next clock cycle. This permits the pipelines in the functional units VU0–VU4 to be full and without gaps.

In a similar manner, status bits of read and write ports are supplied to the VVC register 402 when it controls a dependent initiated memory read or write instruction. When a current memory read or write instruction completes, it sends a port free signal over its line in bus 420 to a compare circuit 422 associated with VVC 402 (and to all other VVC registers). The VVC register 402 has previously captured the memory read or write port number when the instruction is dependent initiated and the memory operation bit was set. The circuit 422 is similar to logic 408; and when the preceding instruction completes, the read increment signal on line 416n is initiated and the dependent initiation memory operation bit is reset. The memory port is prepared for processing of the dependent initiated instruction.

When there is no dependent initiation pending bit in register 402, the inhibit signal to the gate 412a is removed. Similarly, when the memory operation bit equals zero, the inhibit signal from logic 422 to gate 412b is removed. The inhibit to gate 412b is removed if there is no coregister, i.e. the valid read coregister bit equals zero.

So far, all function associated with the VVC registers such as 402, has been related to dependently initiating an instruction and subsequently preparing for the processing of the new instruction when the current instruction has completed execution.

However, the VVC registers are also used for control during the subsequent execution of the instruction (at which time their corresponding V register may become the dependency register of a subsequent dependently initiated instruction). The read increment signals on each clock cycle increments the read address counter. VVC 402 includes a vector length count (VL) field which has a count of the number of vector register elements to be used as operands during processing of an instruction. Each time one operand is processed, the VL value is decremented by logic 424 and returned to the VL field. When the VL value reaches zero, the detect circuit 426 resets the read busy bit in the valid read field. This signals the last of a series of operands to be read from or written into the corresponding V register during instruction execution. Each operand is fed to the port or functional unit for processing in response to a read increment signal.

As described above, the reset of the read busy bit to zero signals a dependently initiated instruction that the functional unit (or port) is ready to accept operands for a next succeeding instruction and the read busy signal frees the corresponding V register from its read busy condition.

If Vk register operand accessing is intended to be started from a V register element other than element zero, the vector not equal to 0 bit is set in VCC. This inhibits read chaining of instructions; and the non-zero element value is entered into the V register address counter instead of the zero value. Incrementing the counter value and use of VL to stop the counter remains the same. The start bit not equal to zero 0 is applies to an increment-decrement logic circuit 430 to inhibit chaining by inhibiting read increment of potential read increment signals.

If the Vi result register of an instruction is the same as one or both of the operand registers Vj, Vk, the write and read identity bit is set and is used to disable the inhibit chaining logic because the write to each element occurs after the read to the element and the data to be read is already in the register. Therefore read increment is not inhibited.

Each VVC register such as VVC 402 includes a GO counter field which is incremented and decremented by logic 430 during chaining operations to assure that writing data into a vector register element (by one instruction) is in fact complete when the read logic addresses that element to read out the newly written data (for a next instruction operation). As each succeeding element in a V register is loaded with write data, the GO counter value is incremented by a write signal on line 429 from write control logic VFX described below. When that element is read, the GO counter value is decremented by the read increment signal. Reading of an element is only permitted when the value in the GO counter is 1 or greater. The valid write bit enables the logic 430 implying that the instruction associated with the VVC register 402 (which is used for "read" control) has been chained to a write instruction. The chained reading is controlled by the logic 430 to prevent premature reading of the chained element data. The vector start not equal to 0 bit inhibits this chaining operation.

Vector Start Register—FIG. 9

Referring now to FIG. 9, the function of the Vector Start (VS) register will be discussed. This is a user programmable register that enables elements in a vector register to be operated upon starting at a relative address instead of being required to start at 0 (the first element), as is the case in prior art machines. Two new instructions, MOVE sk and MOVE q, enable the programmer to set a value in the j field 499 of the VVC register 402 that specifies a calculatable variable or a constant, respectively. This value (VS) is read along with vector length (VL) and vector mask (VM) to determine which elements are going to be used from the instruction input operand. The use of VS eliminates the necessity of some of the usual moves of data between vector registers and some of the usual moves of data to and from memory required in prior art machines. The availability of the vector start mechanism also allows the required loads and stores to be done with fewer vector registers than if VS were not available. The vector start mechanism enables the elements placed in a first vector register to be manipulated by some number of elements in a second register.

Using the VS register, vector elements can be manipulated when the number of elements that need to be shifted or rotated are the full vector length, i.e., VL=64 and when less than the full vector length of elements are being read, i.e., when VL≠64. Additionally, non-overlapping vector elements can also be referenced.

Vector Scoreboard—FIG. 12

The vector register scoreboard 450 of FIG. 12 is not a physical entity but merely a graphical representation of the VCC read busy lines (16) and the VFX output write busy lines (16), one for each vector register.

It is a visual aid in keeping track of the read busy and write busy status of the vector registers. A read bit entry and a write bit entry is shown for each register V0 to V15. A read busy bit is set to "1" at initiation time if a vector register becomes read busy, that is when an instruction is initiated or dependently initiated and this register is the Vj or Vk operand register of the instruction. This VVC busy bit is reset when the instruction has completed (VL=0) and the VVC register corresponding to the vector register has its valid read bit reset. Completing a read instruction is defined as transferring the last data word of the instruction to the proper destination such as the input to a functional unit.

A busy write bit is set to "1" at instruction initiation time when its corresponding vector register is selected as the result register by the Vi field of the instruction. This write busy bit is reset when the last data word of the instruction result is loaded into the register.

The VVC read busy lines and the VFX write busy lines represented by the scoreboard 450 are tested by the initiation logic each time an instruction is decoded for initiation/ dependent initiation.

Vector Register Addressing—FIGS. 6 and 13a–13b

FIGS. 13a and 13b illustrate diagrammatically a preferred form of the vector register address means. The vector register V0 to V15 in unit 233 include data input and output multiplexors 295 and 233 which are described in more detail with respect to FIG. 6.

A group of read address counters 350-0 to 350-15 in a logic block VRR are provided for the vector registers V0–V15. Each address counter, such as 350-0 is coupled to the input address circuits of a respective vector register such as V0 to select succeeding ones of the elements 0–63 of the vector register in sequence. Each VVC register, such as VVC 0, controls incrementing of a respective counter, such as 350-0, during a vector read instruction by issuing a read increment signal each clock cycle (unless inhibited) while the read busy line from VVC 0 is at logical "1". When read busy goes to "0" at the completion of the instruction VL-0, the read busy "0" and read increment "1 " reset the address counters to zero. When a vector register is selected as the Vj operand of an initiated instruction, the value in a vector start register 352 is set into the corresponding read address counter whereby incrementing may start at zero or some other element number selected by the program. In this case, chaining is not permitted. Vk operands always start at zero except when Vj=Vk. No chaining occurs when Vj=Vi since old data Vj is read to form the new data Vi because writing back occurs after read; and the VVC chaining control mechanism is disabled.

Write address counters 360-0 to 360-15 are coupled to the input address lines of respective vector register V0–V15 by way of multiplexors 362-0 to 360-15, and select the corresponding register 360-0 to 360-15 when the appropriate path select value is stored therein. The path select value corresponding to the counter is entered in a register 364-n when the source of data to be loaded into the vector register Vn is one of the functional units VU0–VU4. In this case, the result elements are always "in order" for entry into succeeding vector elements starting at element 0 in Vn. The write address counters do not begin incrementing until a delay, equal to the pipeline length of a selected functional unit, has passed from the application of operand data to its input. Only then is the data transferred from the unit output to the selected V register input. Link list registers LL0–LL15 determine when VFX can start incrementing a respective counter 360-n as data words are provided from a functional unit to a vector register and provide said delay.

The other vector register element address inputs to the multiplexors 362-0 to 362-15 are received from element address outputs of the vector load ports 116-0 to 116-3, referenced as VLP in the drawing. Each port has an "a" and "b" side, thus element address outputs 0a, 0b, . . . 3a, 3b are each coupled to inputs of all multiplexors 362-0 to 362-15. One of these element address port outputs will be selected by a multiplexors for coupling to a respective vector register if the select value in the corresponding register 364-n corresponds to the port and its "a" side or "b" side.

The use of this logic will now be described with respect to data received out-of-order from memory.

Loading Vector Registers with Memory Data Received Out of Order

It will be recalled that the processor request to memory to load data into the V registers are made via the vector read ports 116-0 to 116-3. Each port has an "a" side and a "b" side for making requests for two different instructions. If the "a" side is assigned to a first instruction and the "b" side to a second instruction, the second instruction can make its requests for data (the number of request being equal to VL, the number of words to be loaded into the V register elements) only after the "a" side has sent all of its requests to memory.

The order in which each word of data is returned to the processor port for both sets of requests depends on many conditions in the arbitration node 44 (FIG. 1) and the main memory 14. When a request is sent, it is given a tag indicating the port side "a" or "b" and the vector element (0 to 63) of the V register into which the requested data word is to be loaded. When the data word is returned to the requesting processor port, it is returned with the tag attached to it. The tag is used by port logic and vector register write logic to address the desired vector register element and store the data word into that element. The read port logic also uses the tag to set a bit in a back-bit register 370-0a to 370-3b corresponding to the element into which the data word was loaded.

The vector write logic and read port logic for the four read ports are illustrated diagrammatically in FIG. 13a, and include vector load port logic VLP, vector write logic VFX, write distribution logic VWD, the vector registers V0–V15 and their associated logic VVR, vector read distribution logic VRR, and the VCC register corresponding to the Vi result register into which the data words are being loaded. Elements of interest in VWD, VVR, VRR and VVC and been described above.

The VVC register has been described above and its GO COUNTER field is utilized in the handling of out-of-order data loading to a V register and subsequent reading therefrom as will be seen below.

A portion of each tag includes the element number in which the data word is to be stored. This element number is entered into a register 372-0a to 372-3b depending upon which port 116-0 to 116-3 received the data word and tag and depending upon the tag bit value (0 or 1) which identifies the "a" and "b" sides of the port. The output of theses registers 372 form the outputs 0a–3b which are coupled to inputs to the multiplexors 362-0 to 362-15.

Each time a data word and tag are received from the arbitration node 44 (FIG. 7d), the data is applied to the appropriate vector register by multiplexors 295 within three clock cycles (see pipeline holding means 299 in FIG. 7d). During that time the vector address signals are being formed by storage in a register 372n, transfer to a multiplexor 362n, then to the address logic inputs to the appropriate vector register Vn.

The vector write logic VFX is set with data which indicates the port which is assigned to each vector load instruction at initiation time. The vector initiation logic assigns the port number and "a" or "b" side upon initiation (or dependent initiation) of each V load instruction.

In order to guard against writing more than one data word into the same vector register in the same clock cycle, the arbitration node queues data returns from nine memory sources and sends only one at a time to a port. However, the data is not returned in the order in which it was requested by the instruction.

If no second instruction is chained to the load instruction, the return of data out-of-order gives rise to no problem. However, most load instructions have instructions chained to them and the reading of data from the register being loaded must be in order, starting at element 0. This complexity requires the use of chain control logic in VFX which communicates with the chain control counter field in the VVC registers, and their related logic such as 430 in FIG. 8. The VFX logic sends a write increment signal to logic 430 each time that an additional vector element becomes available for reading, that is an element "in order" has been stored, starting with element 0. The write increment signal increments the VVC GO counter field to permit a read increment output from the VVC register.

The controls for sending these write increment signals will now be described. Each back bit register such as 370-0a has sixty-four bit positions, one for each element of a vector register. Each back bit register has a counter such as 374-0a which points to the zero bit position of register 370-0a when a data request to memory is initiated. Only when the data word intended for element zero is received will an output on control line 376-0a cause the counter 374-0a to be incremented to point to element 1 of register 370-0a. The signal on line 376-0a is also applied to VFX to cause it to issue a write increment signal to the VVC register associated with the vector register into which the data word is to be entered. At an instruction initiation time, a register 378-0a to 378-3b corresponding to the read port selected for the instruction, is initialized with the number of the VVC register corresponding to the vector register into which the data is to be written. Thus when a signal is applied to line 376-0a, the contents Vn of register 378-0a are applied to a multiplexor 380 to apply a signal to the appropriate write increment line to the VVC register associated with Vn. The chain mechanism described with respect to VVC register 402 (FIG. 8) is used to control proper in-order reading of data words from the Vn elements in order.

Thus, data bits are set in the back bit register in a completely random order as corresponding data words are loaded into register Vn. Only when the next succeeding in-order bit is entered into the bit position pointed to by counter 374-0a, does VFX write increment to GO counter of the appropriate VVC register. These write increment signals indicate that the next data word we wish to read has been received and loaded into the appropriate VVC register. These write increment signals indicate that the next data word we wish to read has been received and loaded into the appropriate element in Vn. VFX starts incrementing at element zero of a vector and continues until the counter points to the bit position which equals the instruction vector length, indicating that the load operation is complete. Obviously a long delay in chained reading of the Vn elements could result. For example, if element 0 is the thirty-third element to be returned from storage, VVC will begin reading of Vn for the next instruction thirty-three cycles after it was ready to begin reading of Vn.

Figure 14:
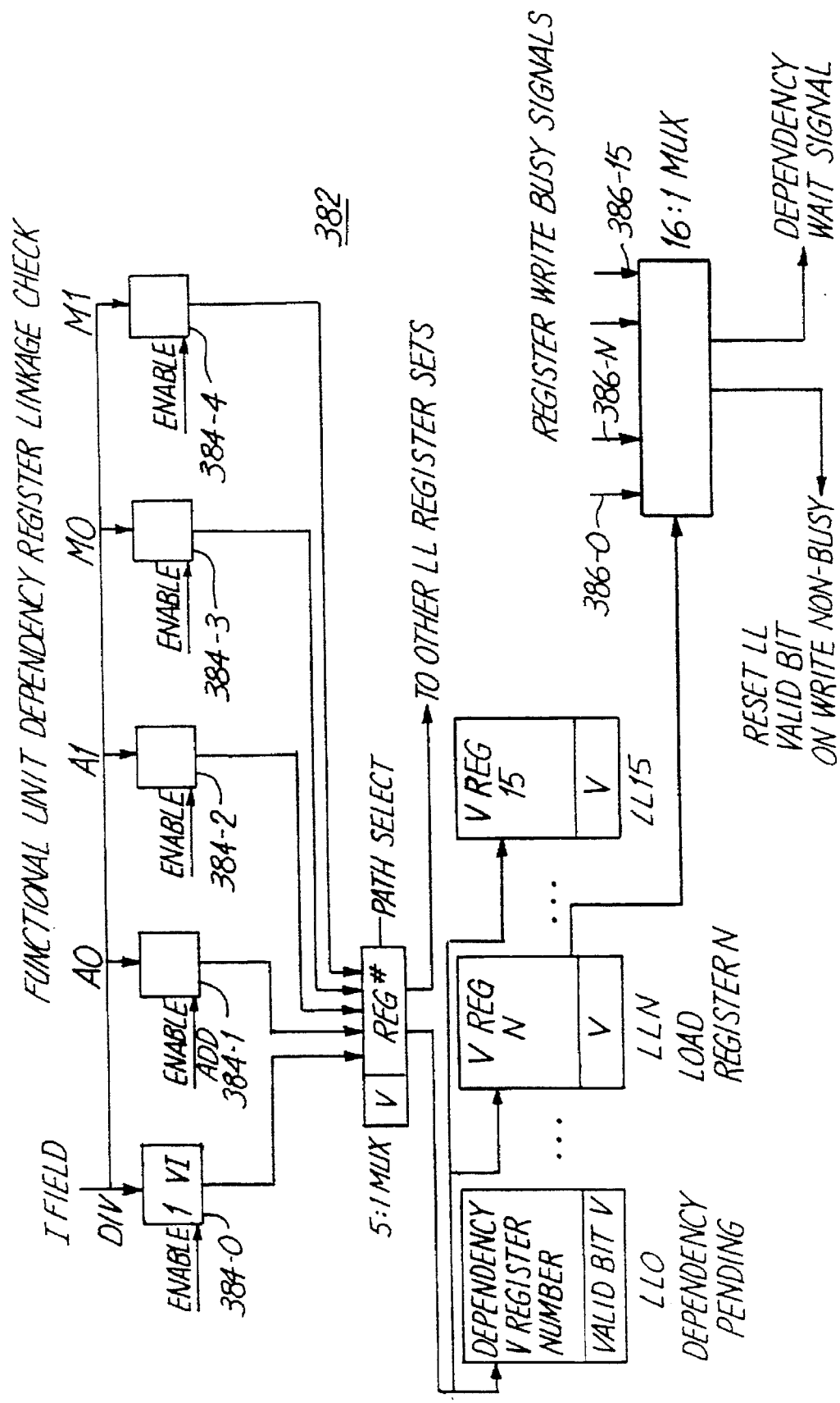
FIGS. 14 and 15 illustrate the link list control logic for vector register write operations from functional units.
Figure 15:
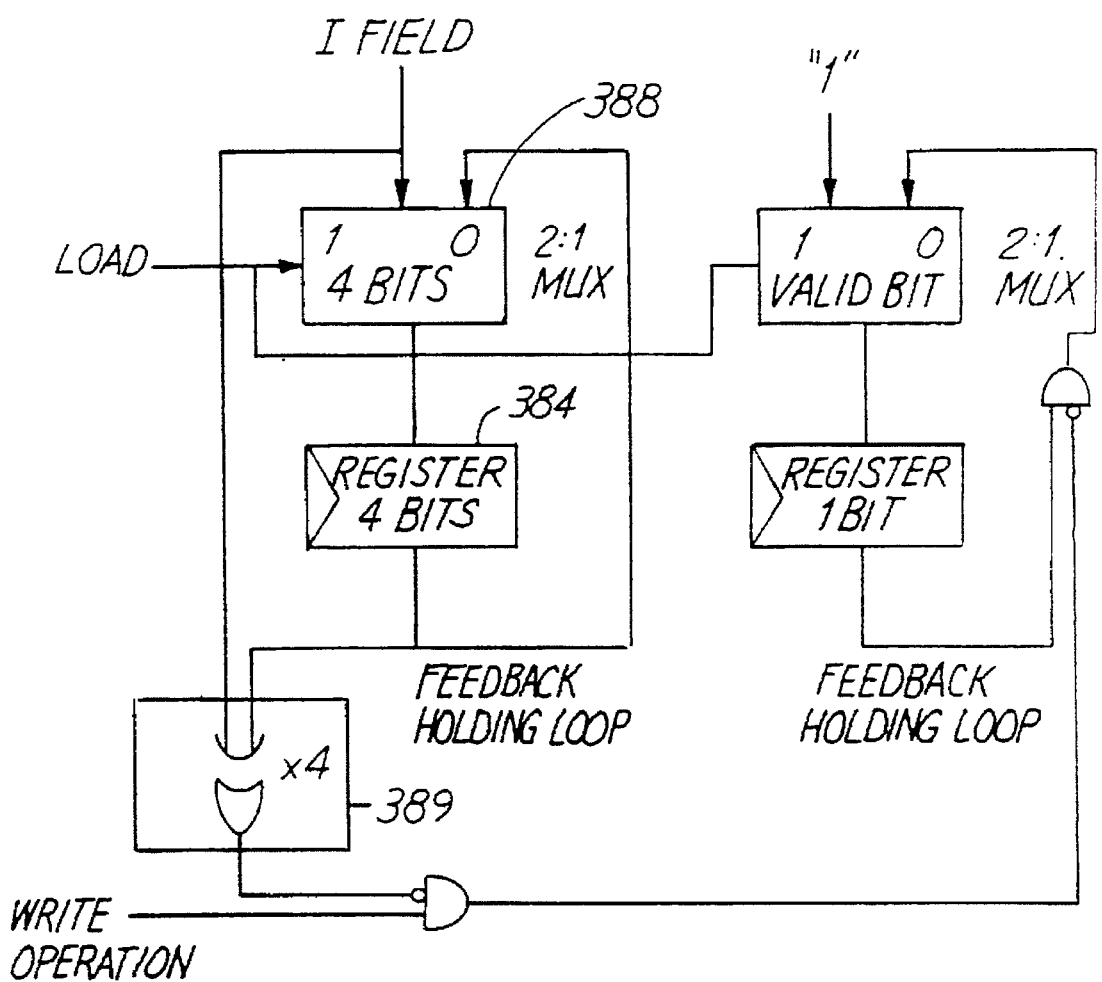

Write Link Lists for Functional Units—FIGS. 14 and 15

Each of the functional units VU0–VU4 has a link list mechanism 382 (FIG. 14) in VFX (FIG. 13a), including registers LL0–LL15, each corresponding to a vector register V0–V15. These are used in write operations to avoid the direct testing of the functional units for their busy/non-busy condition in a manner similar to that described above with respect to VVC registers for read (into functional unit) control.

Status of the VVC registers and their corresponding Vj registers in the dependent initiation queue for each functional unit and ports 116, 118 are used to determine the status of the functional units and ports and act according.

In a similar manner, registers LL0–LL15 for each functional unit indirectly determine the status of the functional units for the register write back portion of the initiation logic.

For purposes of illustration, assume that the divide mechanism in VU0 is selected for instruction execution of a plurality of consecutive short divide operations, each of which has only three or four pairs of operands to act upon. These instructions can be dependently initiated to the divide mechanism in sequence because the read operand registers (and therefore their associated divide functional unit) are released for another dependent initiation instruction after each instruction loads its operands into the divide mechanism. The divide pipeline length is 50 clock cycles; therefore, a substantial number of dependently initiated instruction operands can be flowing through the divide unit pipeline. However, the instruction Vi (result) registers for each of these instructions are still write busy until the results of the divide operation are taken from the divide pipeline and loaded into the appropriate Vi registers.

The link list registers LL0–LL15 for the divide unit keep track of the instruction completion (loading of each Vi) in a manner somewhat similar to that used by the VVC registers to load the function unit pipelines except that each of the five units VU0–VU4 has a set of 15 LL registers. Each divide LL register (corresponding to a respective vector register V0–V15) of one instruction has a dependency register field identifying the number of the Vi register of the preceding instruction. Thus, if the Vi registers for succeeding divide instruction operands in the divide pipeline are first V10, then V5, V8, and V6, the LL register 6 (corresponding to vector register V6) has the vector register number 8 loaded into its dependency register field at dependent initiation time; register LL8 has the number 5 in its dependency register field; register LL5 has the number 10 in its dependency register field.

When the appropriate results of one vector divide operation are stored in V10 (its VL goes to zero), LL10 signals LL5 that it is completed, the vector register scoreboard is updated to reflect V10 is not write busy, and LL5 is in control to route appropriate divide results to Vi register V5. When V5 is loaded, control transfers to V8; when V8 completes, loading control passes to V6. Therefore, the initiation logic does not need to directly test the availability of the functional units and the functional unit pipelines are maintained substantially full with a minimum of gaps. This write back register linkage shown in FIG. 14 will now be described.

There are 10 write back paths 150 (FIG. 6) to the vector registers V0–V15. Five of these paths come from the five functional unit paths, four come from the memory read port paths, and the remaining one comes from the scalar registers. Each of the five functional unit paths has a register linkage to control which register is actively being written to and thus allows multiple vector register write operations to be outstanding in any given functional unit. Memory read operations are handled differently since only one can be active in either the a or b side of any port at a time. Also, scalar transfers to the vector registers are done on a single element basis.

Each of the five functional units has one of the dependency linkage registers 384-0 to 384-4, (FIG. 14). The purpose of this register is to keep track of the last write back register (Vi) to be initiated to that path. Comparison circuitry (FIG. 15) will disable the validity of this information if that register is used for any other path. Each vector register write back control group then has its own dependency linkage register tracking mechanism LL0 to LL15 which is loaded from the appropriate functional unit linkage register 384-0 to 384-4 upon initiation (or nothing if none are valid). This register LL0–LL15 then will hold off acting upon any data that comes out of the dependency register field of the LLn register that is loaded in its linkage register becomes unbusy. This allows up to 16 writes to be simultaneously tracked in any functional unit.

More specifically, at initiation time for a divide instruction directed to the divide functional unit for execution, the register 384-0 corresponding to the divide functional unit is set with the number of the instruction Vi register and the busy bit is set. If another Vi register number is in the holding register 385-0 with the busy bit set, this earlier Vi register number and bit are gated to the LLn register corresponding to Vi of the newly initiated instruction, indicating a dependency.

When the earlier dependency register becomes free because its loading is complete, its busy line 386-n goes non-busy and resets the dependency bit in LL-n so that the next vector results are loaded to the vector register Vn corresponding to register LLn.

Functional Unit Dependent Register Linkage Checking—FIG. 15

Before an instruction is initiated into a functional unit, the Vi field, the V register number of the destination register (the dependent register) of the instruction previously initiated to that unit, must be checked. FIG. 15 shows the checking mechanism.

For example, a divide instruction is initiated into VU0 with a vector register number (Vi field) of 7. On the next clock, the Vi field is loaded into the 2:1 388 multiplexor and the valid bit is set to one. The next divide instruction issues with a destination register number of 5, and before it can be initiated into VU0, its destination register number is checked. A Vi field value of 5 is loaded into the multiplexor and the valid bit remains valid. Later, vector register 5 is to be the destination register for a different type of instruction going into a different functional unit. When the check is made, Vi field 5 stays in the Vi field register, but the valid bit goes to 0 and is no longer valid. That is, a compare circuit 389 finds an equal compare and inhibits the write operation. This inhibits the feedback from the valid bit register causing it to be reset to 0.

This linkage check verifies that the last time a particular destination register (Vi field) has been initiated, it was to this functional unit and to no other functional unit. If a Vi field is not loaded, the feedback loops hold the Vi field data and valid bit information.

Figure 16A:
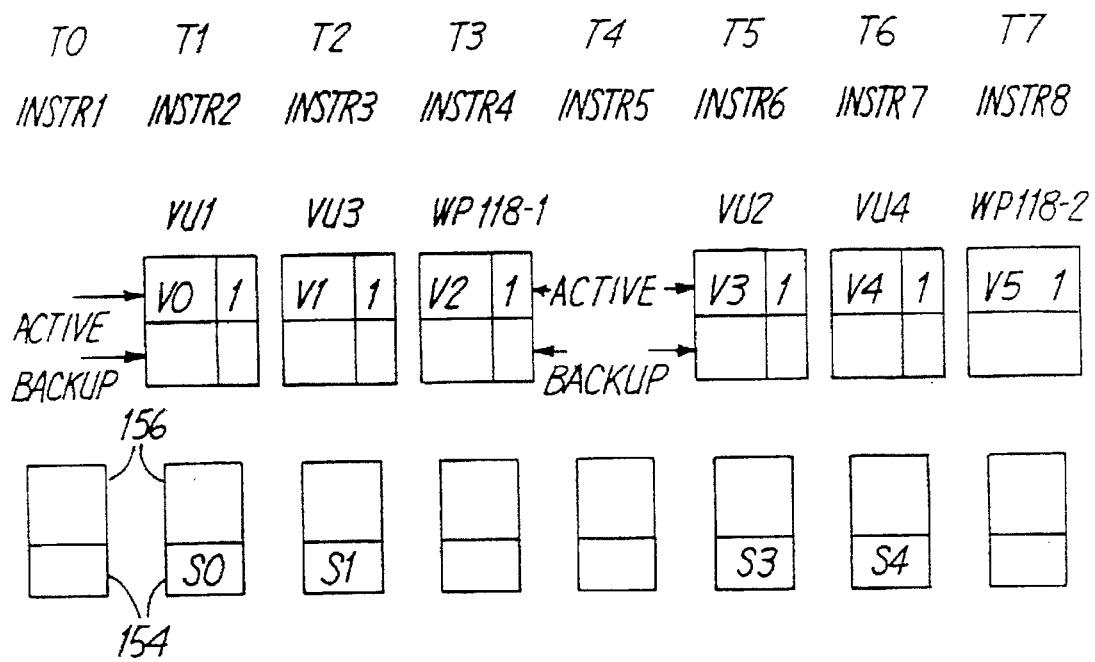
Figure 16A:
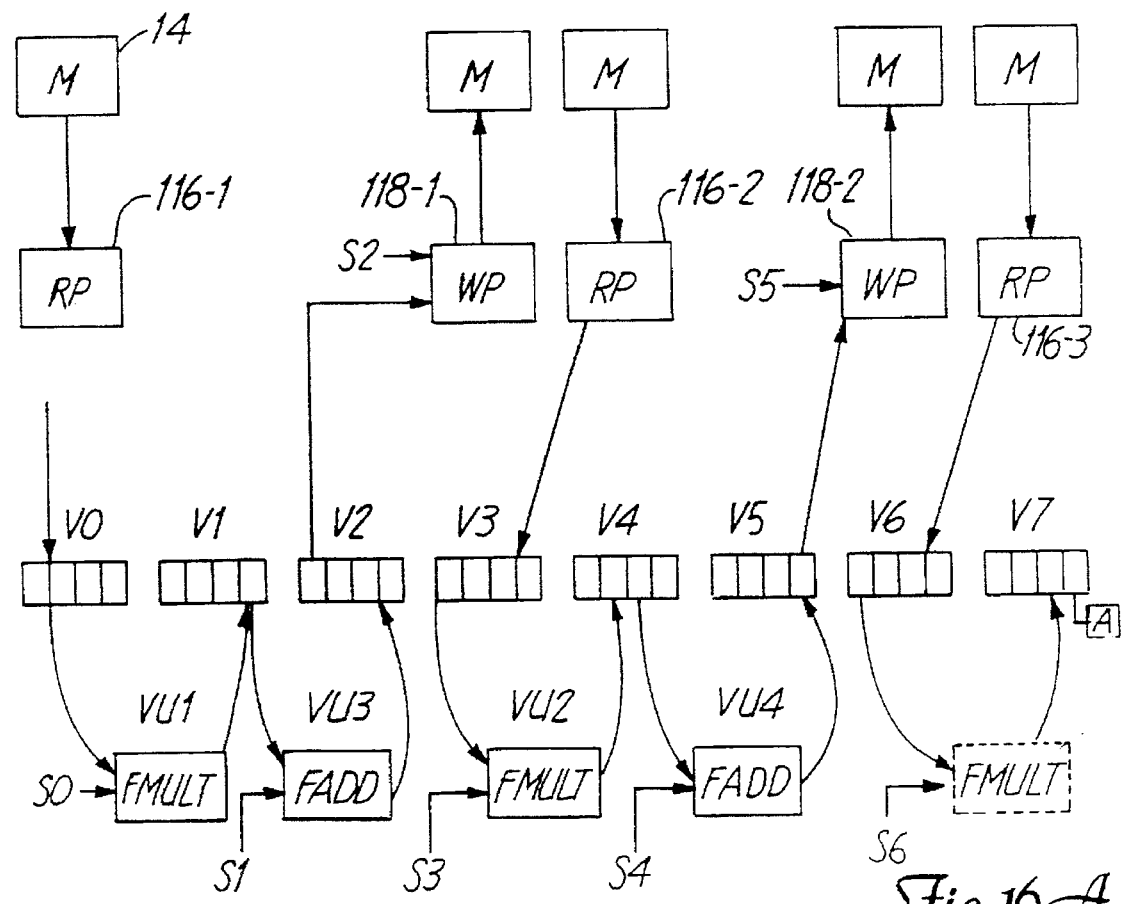
Figure 16B:
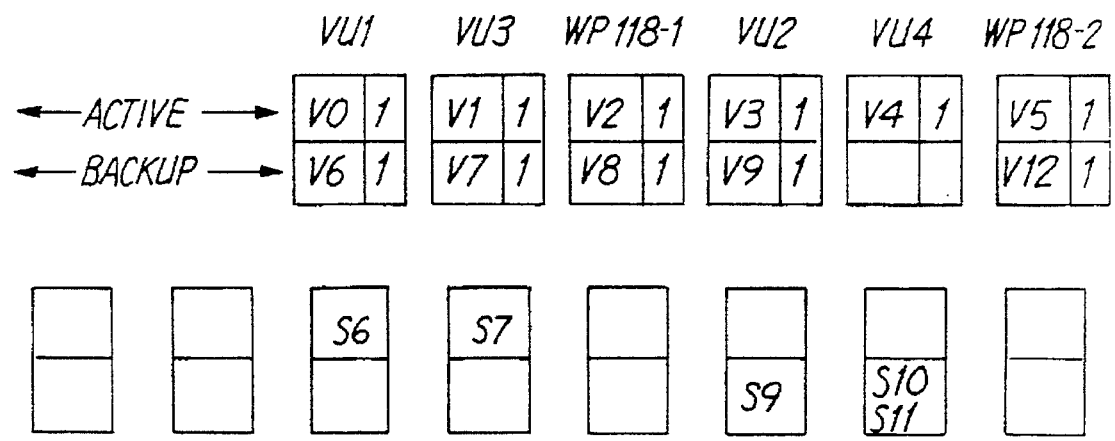
Figure 16B:
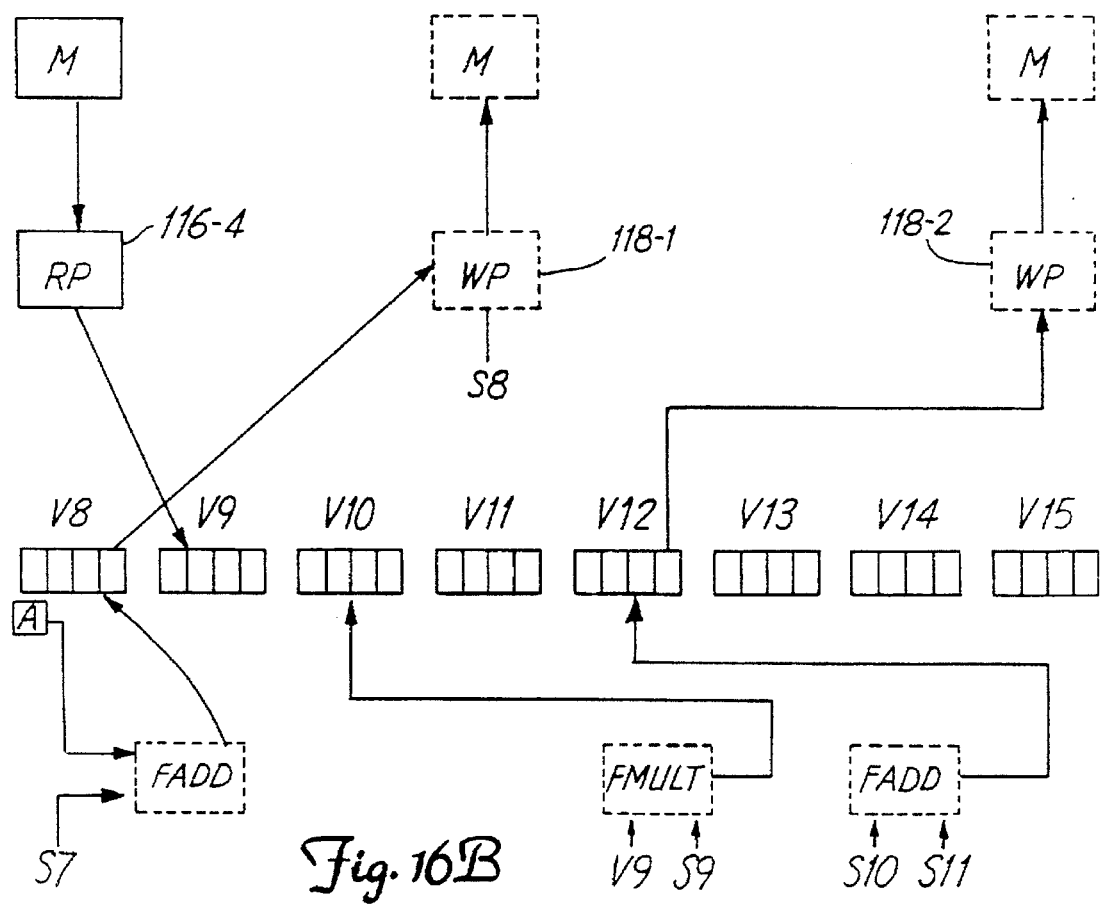

Dependent Initiation Example—FIGS. 16A–16C

Dependent initiation is used as a method to distribute micro operation control to the points that have the ability to react immediately to the termination conditions of the instruction ahead of it in the same functional unit or read/write port. This enables the processor to keep the five functional unit pipelines and ports from having control-based "holes" in them, and thus the processors can operate predominately at (sustain) peak rate, keeping the issue mechanism from backing up due to wait conditions and allowing the opportunity for more instructions to be processed, all of which enables greater performance.

In the preferred embodiment the control chips involved with dependent initiation are:

1) VIX—vector initiation control
2) VVC—vector read chain control
3) VUC—vector function unit control
4) VFX—vector write control
5) VAX—vector memory address control Each of these chips has a set of registers and control inter-communication that is associated with dependent initiation. For example, the VVC register 403 is illustrated in FIG. 9 together with associated controls.

The one instruction-deep dependent initiation queue is illustrated in FIG. 11. With additional registers, this queue could be extended to n deep.

The initiation logic has an up to five-deep instruction queue 132 (FIG. 7C–7D) on it. When it initiates a normal instruction (no dependent initiation), it must check for the following:

1) Current instruction destination register (if any) is not read or write busy such that no other reads or writes are currently outstanding to this target or destination register.
2) Current source register(s) (if any) are not read busy. They may, however, be write busy.
3) Functional unit or read/write port required for this instruction is available.

Now, because the termination of instructions in this logic cannot be predicted due to the fact that execution may be tied or chained to a memory reference instruction, and because this logic cannot be tightly coupled to the chain control, there exists a three clock penalty or dead space between when each of the above conditions is reached, and when initiation of the instruction can be allowed for the use of these available resources.

Dependent initiation allows the constraints of condition 3 above to be loosened. If the initiation logic detects that conditions 1 and 2 are met, but 3 is not, it still may initiate the instruction if and only if there is no pipeline collision possible at the output of the functional unit between the preceding initiated instruction and the subsequent decoded instruction. The functional units have variable pipeline lengths and the length for this decoded instruction must be the same or greater than that of the preceding initiated instruction. Also, the instruction cannot issue if currently there is an instruction in the dependent initiation queue for that functional unit or load/store part. At this point, initiation logic sends the normal initiation signals, but it also sends a dependent initiation signal to the VVC (read chain control logic) with a dependent register field number. This dependent register field tells the VVC logic not to allow read increments to this register until the dependency register becomes free. The dependency register is one of the read registers associated with the data assigned to the functional unit to which this dependent initiated instruction has also been assigned. Another responsibility at initiation is to assign which functional unit path an instruction is to take. If the instruction does not have a valid read register, VUC or VAX has the resources required to stack up this dependent initiation. They have backing buffers that stack the instruction and allow it to flow into the next available slot as will be seen with respect to instruction 15 below.

A sample program describing what would happen without dependent initiation, and assuming the instructions are immediately available, follows (with reference to FIGS. 16A–16C):

1) LOAD (S31+S32)V: load V0 from base address calculated by adding the contents of S regs 31 and 32, stride of 1
2) FMULT S0, V0, V1: multiply the contents of S register 0 with each of the elements in vector register 0 (for vector length) and place contents in vector register 1
3) FADD S1, V1, V2: add the contents of S register S1 with each of the elements in vector register 1 and store the results in vector register 2
4) STORE V2, S2: store vector register 2 starting at the base address (logical) contained in S register 2 with a stride of 1
5) LOAD (S33+S34) V3
6) FMULT S3, V3, V4
7) FADD S4, V4, V5
8) STORE V5, S5
9) LOAD (S35+S36) V6
10) LOAD (S37+S38) V9

The preferred embodiment has four read ports and 2 independent multiply and 2 independent add functional units and 2 write ports. Therefore, the preceding instructions may immediately initiate one after the other. However, the following instructions have to hold issue until each of the functional unit paths frees up plus a three cycle delay penalty.

11) FMULT S6, V6, V7: definite hold initiate plus 3 clock penalty
12) FADD S7, V7, V8: definite hold initiate plus 3 clock penalty
13) STORE V8, S8: definite hold initiate plus 3 clock penalty
14) FMULT S9, V9, V10: possible initiate hold plus 3 clock penalty
15) FADD S10, S11, V12: possible initiate hold plus 3 clock penalty
16) STORE V12, S12: possible initiate hold plus 3 clock penalty With dependent initiation, we would allow instructions to "initiate" immediately one after the other thus avoiding up to a 18 clock penalty plus we could also start executing the following before instruction 16 above would have been issued without dependent initiation (i.e., instruction 11–15 will have filled the queue 132):

17) LOAD (S39+S40) V13
18) LOAD (S41+S42) V14
19) FDIV V13, V14, V15: divide V13 by V14 (element by element) and put results into vector register 15.

Up to a minimum of several hundred (assuming vector length of 64) scalar operations including scalar memory references would have been held off because the vector pipeline clogged and thus held off any further vector instruction issues which in turn stops any scalar instructions behind it.

FIGS. 16A–16B is a timing diagram which illustrates diagrammatically the initiation of instructions 1–10 and the dependent initiation of instructions 11–16 and further illustrates (1) the associated change in status of the V register scoreboard 450 with read busy and write busy bits, (2) the loading of the scalar registers 154 and 156 in the vector register unit 232, and (3) loading of the initiation and dependent initiation queues of the functional units and write ports (FIG. 11), loading VVC, registers with "dependency register" numbers and dependent initiation bits.

Referring now to FIGS. 16A–16C, instruction 1 initiates a read from memory 14 and stores the data in V0 via read port 116-1 (time T0).

Instruction 2 chains to instruction 1, sets scalar data S0 into the scalar section 154 of V register unit 232, sets V0 value and the valid bit into the active position of VU1 (FIG. 11) and initiates the multiply function (time T1).

Instruction 3 chains to instruction 2, sets V1 value and valid bit into the active position of VU3, sets S1 into unit 232 and initiates an add function.

This sequence of activity is illustrated for instructions 4–10. At this time note that the functional units VU1 to VU4, the four read ports 116-1 to 116-4 and the two write ports are busy, and instructions 11–16 will not "normally" issue because the units and ports are busy.

During time periods T10–T15, the dependent initiation feature permits the dependent initiation of instructions 11–16 with the backup positions (FIG. 11) of the dependent initiation queues for VU1–VU3 and WP118-1, WP118-2 are being filled with the values of V register operands of instructions 11, 12, 13, 14, and 16. In instruction 15, there is no V register operand.

FIG. 16C illustrates which vector registers go read busy and write busy during the time period T0–T15.

One and Two Parcel Instructions Executed in One Clock Cycle—FIGS. 4 and 7C–7D

In order to speed up the processing of instructions in the improved processor of the present application, one or two parcel (32 bits or 64 bits) instructions are decoded and issued in one clock cycle.

The instruction cache delivers 64 bit entities (two 32-bit parcels) every clock cycle. Since the improved processor is adapted to execute one and two parcel instructions, its decode mechanism determines which type of an instruction is being examined. If it is a two parcel instruction type and the instruction pipeline has not been stopped, the instruction is issued in one cycle. If the decode mechanism determines that the 64 bit entity comprises two 32-bit instructions, the two instructions are executed in respective clock cycles (two).

Known prior art large hardwired processor systems require issuance of an n parcel instruction in n clock cycles. The cache delivers 64 bit instruction parcels. The present improvement decodes all 64 bits at once, examines the instruction fields, determines whether the 64 bits are one or two instructions, determines which instruction goes where and whether it goes on the first or second issue cycle. This decode mechanism is shown in FIGS. 7C–7D and includes decode units 122a, 129a, 129b.

Figure 17:
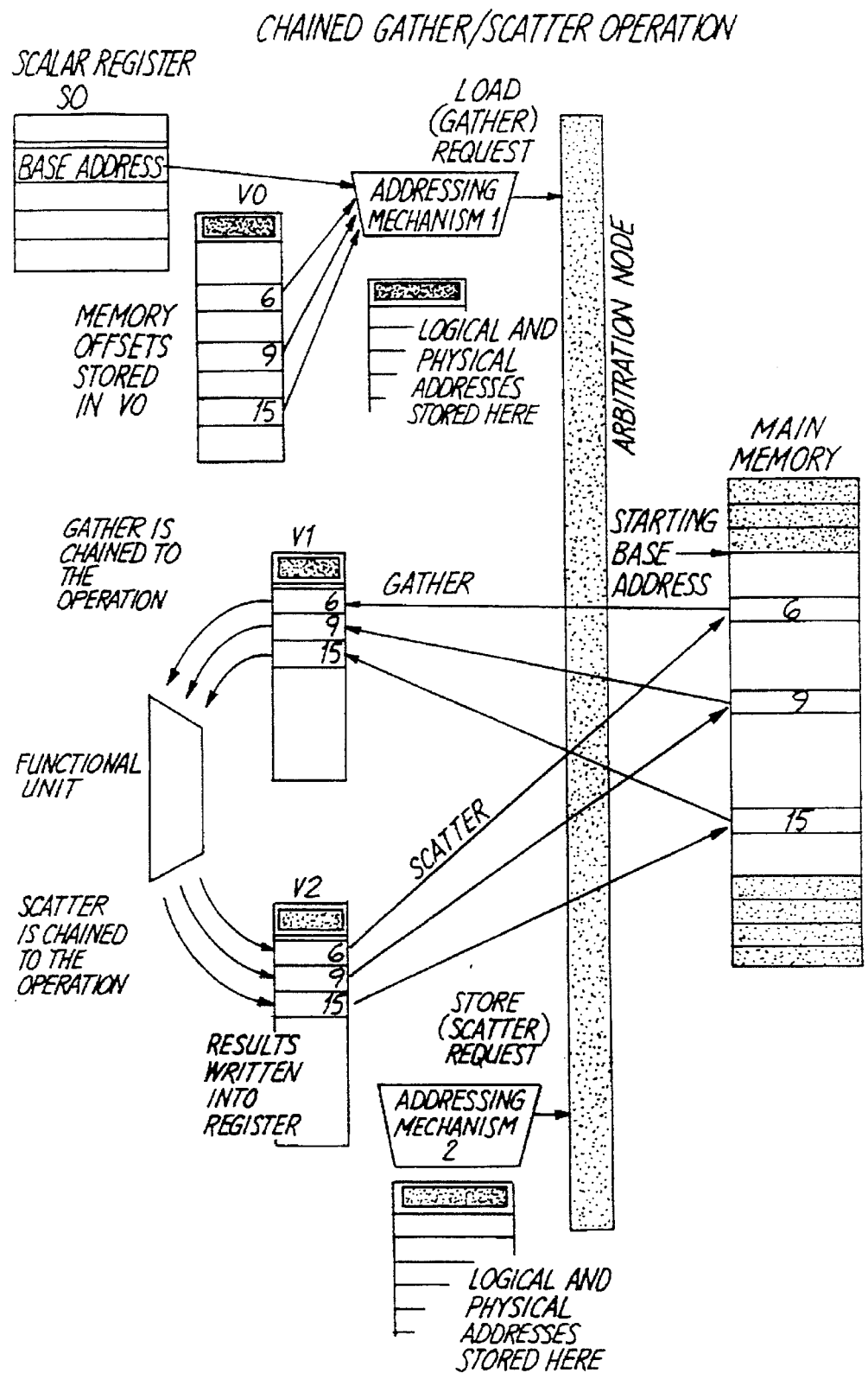
FIG. 17 illustrates diagrammatically the improved scatter/gather operation.

Gather/Scatter Preferred Embodiment—FIG. 17

Unless the memory loads/stores are done at a constant stride, prior art computers have been unable to sustain a chaining operation in which data is loaded out of memory, goes into a vector register, and is fed into a functional unit, the result of which is written to a vector register and is finally stored into memory. They are only able to chain normal loads and stores that access contiguous areas in memory such that memory loads/stores are incremented by a constant so that consecutive data elements are accessed one-by-one.

These computers cannot chain operations when memory reads need to be done at a non-constant stride, or with arbitrary memory addresses, or with indirect addressing where a register provides an offset to a base address in memory. Indirect addressing involves a gather/scatter operation where the gather is a load from memory and the scatter is a store to memory.

The object of the present improvement is to provide new gather and scatter instructions that run fully chained together in the pipeline, as if they were normal loads and stores, but without the memory latency that accompanies unchained gathers and scatters. In prior art computers, when an operation requires non-consecutive loads and stores to memory using an offset from a register, such computations are not supplied with enough resources to sustain a pipeline. Previous processors first load the offset data elements into a register, feed each element of data into the functional unit, and then write each result into a register. At the end of the computations, the register is then stored out to memory. This processing occurs in segments, with built-in cycles of memory read and write overhead.

In the chained gather/scatter of the present application, each data element coming out of memory goes into a vector register and is fed into an operation (functional unit); a result is sent to a vector register and is stored into memory, all in one operation that contains no cycles of overhead. This operation continues loading an element from memory each cycle and storing a result each cycle until the vector elements (up to 64) have been processed. Chaining sends succeeding elements through without halts to be operated upon and stored to memory, thereby covering memory latency and increasing processor and system efficiency. This new capability supports fast processing of Monte Carlo based codes.

By way of illustration, assume the following instruction sequence:

LOAD (gather) (V0+S0) V1
FADD V1, S1 V2
STORE (scatter) V2 (V0+S0)

wherein FADD is chained to LOAD and STORE is chained to FADD.

In reference to FIG. 17, the base address is provided by the scalar register and the non-consecutive offset is provided by vector register V0. This information goes into the addressing mechanism which does the logical-to-physical address translation and sends the request to the arbitration node. One element per cycle returns from memory and is read into vector register V1. In the next cycle the element goes into the pipelined functional unit. In the present invention, the arithmetic operation starts as soon as it receives the first data element from V1. There is a delay corresponding to the number of cycles required by the particular operation complete. One cycle later the result is read into vector register V2 and the next cycle it is on its way to its unique offset in memory. The addressing mechanism maintains the logical and physical address translations resulting from the LOAD (gather) instruction. The result is that in the present invention gather and scatter instructions run fully chained together in the pipeline, as if they were normal loads and stores.

Receiving data from memory out-of-order with respect to the order of request is controlled in a manner described above with respect to FIGS. 13a and 13b.

Figure 18:
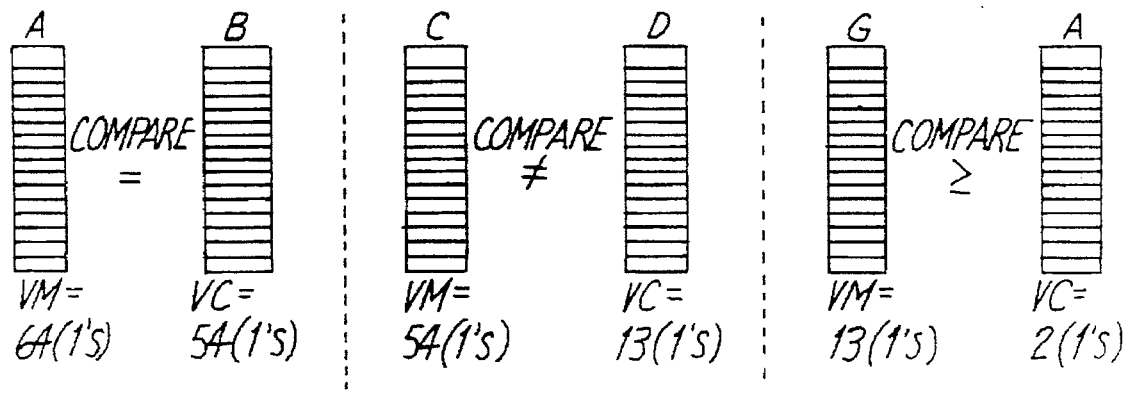
FIG. 18 illustrates diagrammatically the improved conditional IF feature.
Figure 18:
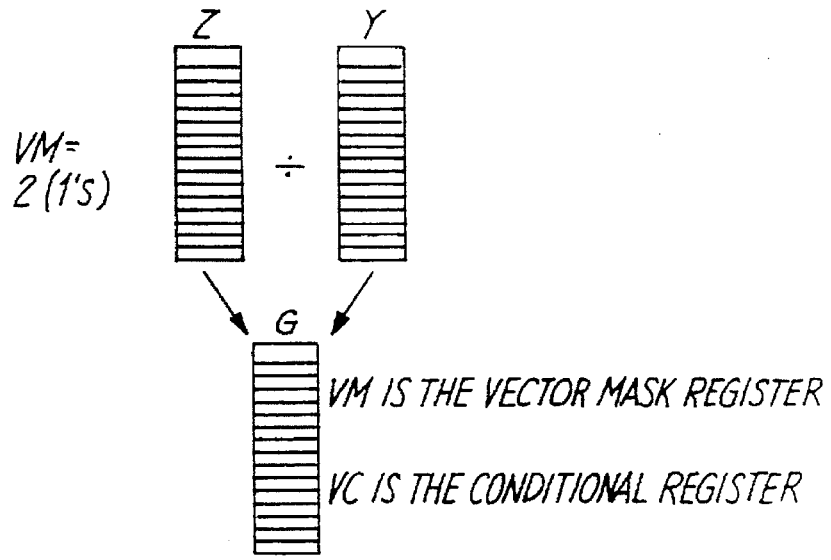

Vectorization of Conditional IF Statements—FIG. 18

Prior art machines are not able to successfully or consistently vectorize conditional IF statements. Such a statement requires a conditional execution of an element. As an example: IF A=B, THEN do C, ELSE do nothing. When one element is involved, as in a scalar operation, execution of an IF is straightforward. Vectorization introduces problems, and to vectorize such a statement on an element-by-element basis is difficult and time consuming.

An object of the present invention is to provide a mechanism that vectorizes conditional IF statements and processes them efficiently. The present invention introduces the vector condition means and vector mask means as a mechanism to vectorize IF statements. The vector mask (VM) register controls each element of a vector operation. Element zero of the result is controlled by bit 0, element one by bit 1, and so on. If the corresponding VM bit is zero, the contents of the target vector register are not altered, and that element will contain valid previous data. A floating-point operation will not cause an exception if its VM bit is zero, and a memory write will not store data or cause an operand range error. A load from memory, however, is not affected by the VM register.

The VM register may be read or written by user code. It may be loaded from an S register, or loaded directly from the vector condition register. Because VM is copied when the instruction issues, the VM register may be reloaded immediately after issue without affecting the ongoing operation.

Using the vector condition (VC) register, it is possible to compare the elements of two vectors and to set the VC register to reflect the results. Each bit of the VC register corresponds to an element number, with bit 0 corresponding to element zero, and so on. For example, one could compare two vector registers for floating-point equality. Thus, each bit of VC would be set or cleared depending on the equality of each pair of elements. VM does not affect this operation. Only bits zero through vector length −1 will be altered. VC can be moved into an S register or directly into VM.

More than one operation at a time may be written to the VC register, but only the most recently issued instruction will determine the final contents. When the conditional IF statement is true, it is sent through the vector conditioning register. The vector condition value moves to the vector mask register and then the operation is actually done.

For all of those elements that are not true, that is, which are 0, then the operation is not done. The mechanism of the present invention is easily and efficiently able to vectorize conditional IF statements. Furthermore, this system does multiple conditional vector processing. The vector processor does multiple conditional IF statements, sending few of the operations to the scalar side. Prior art machines are able only to perform multiple conditional operations by using scalar processing.

In the example of FIG. 18, three conditional IFs precede a vector divide operation. A is compared with B using the vector mask with all positions (64) filled with "1"s. In the example it is assumed that 54 element pairs compare equal and those element positions are marked in the condition register VC. The contents of VC are transferred to the mask register VM and C is compared ≠ with D, only 13 element pairs comprising ≠ of the 54 compares done. VC is filled for those 13 element positions and the contents of VC are transferred to VM. G is compared against A in the 13 element positions under control of VM. Only two elements of the 13 in G compare equal or greater than corresponding elements of A and these two positions in VC are set. The contents of VC are transferred to VM to cause only 2 element pairs of Z and Y to be divided under control of VM.

Delayed Branching

Branch instructions in prior art supercomputers consume many cycles of time and incur long periods of execution inactivity while the branch executes. Typically, branch instructions require that two entities be compared. Depending upon the outcome of the comparison, the originally specified functional operation may not be performed and another operation may be done instead. Existing supercomputers process a branch instruction first by doing the comparison and then entering the outcome into a decision making process. This decides whether the original pipeline path will be adhered to or if a jump to another pipeline path will be taken. While the decision is being made, no processing of instructions can be done. There is latency in turning the pipeline around, in transferring data and an instruction from one functional unit to another, and some time is lost in getting the branch made and in getting instructions flowing right behind the new branch. Branches typically cause penalties in unused and therefore wasted processor time, for example, the decision process can require as many as seven cycles.

An object of the present invention is to execute branch instructions efficiently with a minimum of wasted cycles that impair processing performance. The present invention contains a delayed branch mechanism that takes advantage of delayed branching and delayed branching techniques to enhance scalar processing performance by maintaining the flow of the instruction pipeline. As a result, the present invention will perform some amount faster than an equivalent processor lacking this feature.

The delayed branch mechanism includes new branch instructions in which the compare code is included in the instruction. This immediately saves one cycle of comparison time in the pipeline. Further, the delayed branch mechanism covers the branch decision cycles by inserting three words of instructions prior to the execution of the branch itself, hence the term delayed branch. The three words of delay instructions are issued after the branch issues but before the branch takes effect. At the point the three words of instructions have initiated, it is known whether a jump to a different pipeline will be made.

The delayed branch mechanism of the present invention also employs a branch prediction means through a special branch instruction in which the possibility or denial of a branching jump is predicted.

Because the delay words may contain any combination of one and two-parcel instructions, there are between three and six delay instructions issued. If the instructions take more than four cycles to issue, the branch completion is delayed until the delay instructions all issue. If the delay instructions take less than four cycles to issue, the delayed branch mechanism still allows four cycles for the issue time.

If the branch occurs and the jump is taken, there is no gap in the instruction pipeline flow. An example follows that compares the instruction pipeline flow between a processor without the described delayed branch mechanism and the improved processor of the present application with the described delayed branch mechanism.

| Cycle: | Without delayed branching: | With delayed branching: |
| --- | --- | --- |
| 1 | issue compare instruction | issue branch/compare |
| 2 | ***processor | issue (at least 4 cycles of |
| 3 | ***does the compare | issue delay instructions |
| 4 | issue branch instruction | issue issue, up to a |
| 5 | ***processor busy | issue maximum of 6) |
| 6 | ***the next several | complete branch |
| 7 | ***cycles to do | issue next instruction |
| 8 | ***branch decision | issue next instruction |
| 9 | complete branch | issue next instruction |

With delayed branching, no cycles are wasted when the jump is taken. If the jump is not taken, the present invention requires 5 cycles for recovery and refill of the instruction pipeline.

Referring now to FIGS. 7A–7B, when a branch instruction is sent to the program sequencer mechanism 60, the lower part of the branch feeds into adder 64. It also can be fed into multiplexor 66 to the other multiplexor 68 in order to be an obsolute branch address. The lower part of the branch also goes to the target register 70. The target register will be used if the branch is not being taken immediately; if the branch is rated as unlikely, this register is maintained in case the branch is actually taken.

In the case of a likely branch, the target instruction address is loaded immediately into the program counter as well as into the target register. In both type of branches, the target is loaded into the target register, but only with likely branches is the target instruction address loaded into a PC register.

However, if the compiler predicts incorrectly and the branch is not taken, a cost of five cycles is incurred while a restore procedure is run to back up, reload the values stored in the save PC register 74, and restart issuance of instructions. The proportion of correct predictions to incorrect ones is such that the number of restore cycles will be insignificant.

The fill instruction is another mechanism for the efficient resolution of branch instructions. User code can do instruction cache fills corresponding to parts of the branches before it is known if the branch will be taken or not. This lets the compiler decide what should or should not be filled from memory into the cache prior to knowing the likelihood of the branch. This provides two degrees of likely with respect to branch predictions: one which is so likely that a memory fetch can be made, one that is likely but a wait for the memory fetch is maintained. Combining the fill instruction with the branch likely/unlikely values provides the compiler some degree of control over the relative latency of branches.

Another situation also creates a need for the save PC register 74. A branch instruction can issue as often as every four cycles, one for the branch instruction itself and three for the instructions put into the delay slots. More than four cycles are required for a branch to be resolved. Beginning at path 62, the branch instruction is in the issue mechanism; in the first clock it decodes, in the next it issues, in the next the operand goes to the functional unit, the next clock does the compare, in the next the branch is either taken or not, in the next it moves to the program sequence mechanism, and in the last clock, if no branch, the PC is reloaded from the save PC register 74. The branch always uses more than four, but less than eight cycles. When two branches are outstanding at any one time, the second branch can start in behind the first because of register support. If an older branch is predicted wrongly and is not taken, the newer branch is invalidated.

Context Switching—FIGS. 7A–7B and 17

Context switching is prompted in several ways. One is through execution of a trap instruction to make an operating system call, critical to system performance. Another context switch involves the return of exceptions from the operating system to the user and is equally performance critical. Interrupts caused by external events such as another processor, memory, or an I/O device interrupting this processor are sources of other context switches.

In prior art machines, the typical context switch method is to "quiet" the processors until all activity completes and there is a point at which there is no activity. During this quieting, instructions stop issuing, memory requests complete, registers are dereserved, and so forth. At the all-quiet point, registers are swapped to memory to save the state of executing processes and other user information, and then the processor starts to execute in system mode rather than in user mode. At the switch back into user mode, machine cycles are used to restart the processing activity.

As pipelines get longer, the time required to reach all-quiet increasingly affects performance. For example, the time required to issue a privileged (system only) instruction requiring 25 clocks may require many hundreds of additional clocks just to achieve the all-quiet and do the switch.

The object of the present invention is to do context switching between user and system code as fast as possible with as little interruption to the system as possible.

The present invention provides context switch mechanisms which eliminate the processor quieting and all-quiet periods. In the present invention most context switches are handled by the scalar processor and allow the vector side to continue uninterrupted processing. The present invention provides a number of mechanisms that support very fast context switches in which system code can execute in the pipeline manner of user code and instruction issue is not halted.

Referring now to FIGS. 7A–7B, the primary mechanism supporting fast contact switches is the instruction cache 110. A general description of its role in fast contact switching follows.

In the instruction cache there are 16 sets of instruction buffers, each one referenced by an address consisting of the upper bits of the memory address from which it came and an additional bit, the mapped/unmapped bit. The instruction cache buffers typically correspond to user codes but are loaded with system instructions when a context switch, such as a trap instruction, is received. The trap instruction requires that the processor go to system code. Upon receiving a trap instruction, the methods of prior are machines would require that the entire instruction cache be invalidated. The present invention invalidates only a single instruction cache buffer and loads the system code into that buffer. This will effect a context switch into system mode. Later, when the switch is made back to user mode, up to fifteen buffers may still be there, ready to be processed. The instruction pipeline continues to run with at most one buffer having to be replaced. It is possible that a system call may be coded in an inner loop of code. In this case, the user code and system code both remain in the instruction cache. The instruction cache mechanism enables unmapped and mapped code to coexist within the cache.

The mechanism that supports trap instruction handling includes the pipeline delay holding means prior to the cache, the instruction cache 110 itself, and the pipeline delay holding means 201 shown in FIGS. 7A–7B.

The instruction cache 110 delivers instructions to four places. One is the instruction decode and issue means 122a and 122b including the holding means before 122a, with the actual instruction issue decision making logic means being 122b.

Instructions are also delivered to the literal staging means 128 and to the instruction decode means 129. The last place where instructions are sent is into the program sequencer mechanism 60.

The program sequencer mechanism 60 generates a series of addresses which are fed back to the instruction cache. The program sequencer 60 is part of a loop in which it generates an address in the program counter (PC) register 126, causing an instruction to be read. The program counter register contains an internal sequence of addresses. The addresses are fed to the instruction cache, instructions are read up in the cache, and the cache sends instructions back on path 62 to the program sequence mechanism to modify what is in the program counter. The program sequencer increments if there is a slot in the instruction pipeline, it does not increment if the pipeline is full; it can take branches and trap instructions.

Context switch addresses come from four different places. In the case of an interrupt, there is a control register which contains an IAD interrupt address. For an exception such as an overflow, there is an EAD control register exception address. For a return from trap instruction, which is the operating instruction returning the system to user code, there is an OPC register 74 that was previously loaded with a return address. From the trap instruction address, a SCA system call address is derived which identifies one of 256 places where system code can be entered.

The availability of system code addressing supports the speed of the context switch mechanism of the present invention. In prior art methods, there is one access address to the operating system that requires an instruction buffer fill to reach. In the mechanism of the present invention, trap instructions that are frequently repeated, an extended memory transfer, for example, has the switching code as part of the instruction itself, and in fact the code becomes part of the address. The trap instruction is read from the instruction cache 110 and is sent back to the program sequencer mechanism 60. The program sequencer mechanism 60 sees the trap as a kind of a branch, but, with no jump information, it takes no action. Simultaneously, the trap instruction goes into the issue mechanism through the decode means 122a and issue means 122b. Information about the trap instruction is sent to the context control mechanism which determines if any interrupts or exceptions are pending and prioritizes them. Priority depends upon the place of the trap instruction in the word parcel. If it is in the right parcel it has priority over interrupt and exceptions; if it is in the left, it does not. This is because something that is halfway between two parcels cannot be stored as a return address.

The selected address from the prioritized traps, interrupts, and exceptions goes into a context switch register 80 (FIGS. 7A–7F) and is sent back to the program sequences mechanism 60 by way of bus 82. There it is loaded into the program counter 126 and instructions resume. It takes eight cycles to do a trap instruction, including one cycle to issue. There are seven cycles during which no instruction is issued, timed from when the program counter shuts down and a new address is selected. Some of the seven cycles are used to make sure the control registers empty. This is the extent of the "quieting" required for context switching in the present invention. The pipelines are not fully stopped, since during this period, scalar instructions can be finishing, and the vector pipelines can be fully functioning.

It will have been noted from the description thus far of the new context switching means of the present invention that the first part of the mechanism deletes the many-cycle quieting of the system; specifically, traps are done very quickly with no all-quiet period. It will also have been noted that new means are provided to order the system code and addresses including software controls and proper staging of the control bits in hardware.

A further example of the new context switching means is in the case of data references to memory.

References to memory are either mapped or unmapped; user code is usually mapped while system code is typically not mapped. In some prior art machines, the mapping is fairly trivial. However, the base and bound registers for instructions and data are part of the context switching, and incur extra delay for loading.

The context switching means of the present invention employs many registers to support mapping. It would take a prohibitively long time to swap them in and out of memory. Swapping is replaced by a fast shutdown of the registers with one bit that indicates an instruction is mapped and another bit that indicates data is mapped. The operating system can load the mapping registers then set the mapping bits. While the user is not allowed to alter the state of those bits, a context switch sets the bits to disable mapping. Mapping bits are maintained by a set of system mode (SM) registers assigned to both the scalar and vector processors. The SM registers contain important control bits including the privilege bit (determines whether in system or user mode), the data and instruction mapping bits, and the disable bits for interrupts and exceptions. The RTT instruction restores the previous state of the mapping bits from operating system memory.

An example of mapping bit usage follows. In this example an L register clock store to memory is issued. The SM register indicates the data is mapped. The mapping bit is copied from the instruction into the memory port to be used for the store and then remains in the port for the duration of that instruction. After the L register store has started, a context switch into system code occurs. The SM register now indicates the data is unmapped, the bits having been reset. However, the ongoing memory reference still has a copy of the previous mapping and it proceeds uninterrupted.

Although most context switch activity takes place in the scalar processor, the vector side can be involved, for example, when a trap instruction requires a vector store to memory. Because mapping and system privilege mode information in the vector SM register can lag behind the scalar SM register, the scalar SM register is used to update its vector counterpart. When context switch data is written to the scalar SM register, an instruction that mimics a trap instruction is sent to the vector instruction initiation queue. Any uninitiated instructions currently in the queue can initiate with the existing mapping and privilege bit values in the vector SM register. When these instructions finish initiating, the false trap instruction initiates and resets the vector SM register to the system mode values. At this point the vector store from the trap instruction is done in system mode. After the trap instruction completes, the vector SM is reset and user code instructions continue to issue. In effect, the processing of vector instructions is uninterrupted and the context switch is achieved.

As has been described, the context switch mechanism of the present invention does not support an all-quiet period in hardware. Certain special system needs, such as the need to run diagnostics, do require an all-quiet. Such an all-quiet state is provided using new software means. The global marking mechanism and the local marking mechanism make sure that memory operations are completed. The scalar user status register and the vector user status register provide hardware verification that all scalar and vector operations are completed to the print where no exceptions will occur from them. The exception status register is checked for any outstanding exceptions. With memory, other processor requests, I/O, and exceptions quieted, the diagnostics can be run. There is no explicit mechanism to actually wait for register results to quiet because, when a register is used on this machine, the register can be stored and it will wait to be used again.

DESCRIPTION OF APPENDICES

A summary of the instruction set for the present invention is set forth in Appendix A which is attached hereto on microfiche. A detailed description of each instruction is set forth in Appendix B which is also attached hereto on microfiche. [A summary and detailed description of the various processor C registers that are controlled or affected by the instructions is set forth in Appendix C which is also attached hereto.] A detailed list of the lines interconnecting the various components of the processor system and a brief description of function of each line is set forth in Appendix D which is also attached hereto on microfiche.

We claim:

1. Data processing apparatus comprising:

vector instruction requesting means responsive to a first instruction for making requests to memory for vector data words in a selected request order;

vector instruction retrieving means for retrieving the requested vector data words from memory in an order different from that in which the requests are made;

a plurality of vector registers, each having vector elements and each having respective read and write accessing means;

means for loading the retrieved vector data words into one of said vector registers as the vector data words are retrieved in vector elements corresponding to the selected request order;

instruction processing means responsive to a second instruction for chaining the second instruction to the first instruction to read the vector data words from vector elements of said one vector register in the selected request order and to perform a first operation corresponding to the second instruction on the vector data words; and means for inhibiting said reading of the vector data words from each succeeding vector element until said each succeeding vector element has been loaded with its received data word.

2. A vector processing system comprising:

a main memory;

a plurality of vector registers, each having vector elements;

program controlled vector means for requesting an ordered set of data words from main memory;

means for retrieving said data words from main memory in an order differing from the order in which the data words are requested;

means for storing each data word as the data word is retrieved into a selected one of said vector registers but into an element of said one vector register corresponding to a position of the data word in said ordered set;

program controlled means for reading said ordered set of data words in sequence from consecutive elements of said one vector register in a chained mode of operation; and control means for inhibiting the reading of each data word of the ordered set from the data word's vector register element until said each data word is retrieved and stored into the data word's element.

3. The vector processing system of claim 2 wherein the means for storing stores each successive data word in said vector register in clock cycles which are not necessarily consecutive.

4. In a vector processing system having a main memory, a plurality of vector registers, vector resources for accessing memory to transfer vector data between main memory and the vector registers and to perform operations on said vector data, a method for accessing data words stored in non-consecutive address locations of a segment of main memory for processing comprising:

(a) storing in non-consecutive elements of a first vector register the offset address values of a number of said data words;

(b) executing a single vector gather instruction which (1) adds each offset address value to a base address value to calculate main memory addresses representing main memory storage locations of said data words, (2) requests said data words from main memory in a sequential order corresponding to that in which the offset address values are stored in the first vector register;

(3) retrieves said data words from the main memory storage locations corresponding to the calculated main memory addresses, and (4) stores said data words in consecutive elements of a second vector register in the sequential order corresponding to that in which the offset address values are stored in the first vector register; and (c) chaining at least a second vector instruction to the gather instruction for performing an operation upon said retrieved data words and storing the results in a third vector register.

5. The method of claim 4 further comprising the step of chaining a single vector scatter instruction to said second vector instruction to return said results to the main memory storage locations of the corresponding retrieved data words.

6. The method of claim 5 wherein the retrieved data words are returned for storage in said second vector register in an order differing from the sequential order in which the data words were requested from main memory by the gather instruction.

7. The method of claim 6 wherein the retrieved data words are stored in the consecutive elements of the second vector register as set forth in step (b) (4) in the sequence in which the data words are received.

8. Data processing apparatus comprising:

a plurality of vector registers;

vector program controlled means responsive to a plurality of instructions for retrieving operands as a plurality of elements of an ordered set of operands from each of said vector registers and for loading results as a plurality of elements of an ordered set of results into each of said vector registers, wherein said vector program controlled means is effective for retrieving an ordered set of operands from a vector register starting with an operand other than the first operand of the ordered set;

means for chaining an execution of a first of the plurality of instructions to an execution of a second of the plurality of instructions; and means for disabling said chaining means when vector operand retrieval starts with an operand other than the first operand of an ordered set.

* * * * *

UNITED STATES PATENT AND TRADEMARK OFFICE
CERTIFICATE OF CORRECTION

PATENT NO. : 5,640,524
DATED : June 17, 1997
INVENTOR(S) : Douglas R. Beard, et al It is certified that error appears in the above-identified patent and that said Letters Patent is hereby corrected as shown below:

On the title page: under "[56] Reference Cited-U.S. Patent Documents". add --

| | | |
|---|---|---|
| 5,063,497 | 11/91 Cutler, et al | 395/800 |
| 5,073,970 | 12/91 Aoyama, et al | 395/800 |
| 5,127,093 | 1/92 Moore, Jr. | 395/375 |

At Column 35, lines 14-17, please delete "[A summary and detailed description of the various processor C registers that are controlled or affected by the instructions is set forth in Appendix C which is also attached hereto.]"

Signed and Sealed this

Nineteenth Day of May, 1998

*Attest:*

BRUCE LEHMAN

*Attesting Officer*   *Commissioner of Patents and Trademarks*